United States Patent
Hudecek et al.

(10) Patent No.: US 11,077,878 B2
(45) Date of Patent: Aug. 3, 2021

(54) DYNAMIC LANE BIASING

(71) Applicant: Zoox, Inc., Foster City, CA (US)

(72) Inventors: Janek Hudecek, Redwood City, CA (US); Victoria Magdalena Dax, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/566,821

(22) Filed: Sep. 10, 2019

(65) Prior Publication Data

US 2020/0398894 A1    Dec. 24, 2020

Related U.S. Application Data

(63) Continuation-in-part of application No. 16/179,679, filed on Nov. 2, 2018.

(51) Int. Cl.
| | | |
|---|---|---|
| *G05D 1/00* | (2006.01) | |
| *B62D 15/02* | (2006.01) | |
| *G05D 1/02* | (2020.01) | |

(52) U.S. Cl.
CPC ....... *B62D 15/0255* (2013.01); *G05D 1/0088* (2013.01); *G05D 1/0212* (2013.01)

(58) Field of Classification Search
None
See application file for complete search history.

(56) References Cited

U.S. PATENT DOCUMENTS

| | | | |
|---|---|---|---|
| 9,120,485 B1 | 9/2015 | Dolgov | |
| 9,523,984 B1 * | 12/2016 | Herbach | ............... G05D 1/0088 |
| 2013/0110368 A1 | 5/2013 | Zagorski | |
| 2015/0120137 A1 | 4/2015 | Zeng et al. | |
| 2015/0345959 A1 | 12/2015 | Meuleau | |
| 2015/0353085 A1 | 12/2015 | Lee | |
| 2017/0120804 A1 | 5/2017 | Kentley et al. | |

(Continued)

FOREIGN PATENT DOCUMENTS

| | | |
|---|---|---|
| CN | 109878513 A | 6/2019 |
| DE | 102013214225 A1 | 1/2015 |

(Continued)

OTHER PUBLICATIONS

Non Final Office Action dated Feb. 10, 2020 for U.S. Appl. No. 16/179,679 "Adaptive Scaling in Trajectory Generation" Hudecek, 8 pages.

(Continued)

*Primary Examiner* — Tamara L Weber
(74) *Attorney, Agent, or Firm* — Lee & Hayes, P.C.

(57) ABSTRACT

Techniques for generating trajectories and drivable areas for navigating a vehicle in an environment are discussed herein. The techniques can include receiving a reference trajectory representing an initial trajectory for a vehicle, such as an autonomous vehicle, to traverse the environment in a first drivable area. An object within a distance threshold can be detected in the environment and a second drivable area can be determined. Further, the techniques can include determining a target trajectory based at least in part on the reference trajectory and/or the second drivable area which can provide a region for the object to traverse the environment, and controlling the autonomous vehicle to traverse the environment based at least in part on the target trajectory.

20 Claims, 16 Drawing Sheets

(56) References Cited

U.S. PATENT DOCUMENTS

| | | |
|---|---|---|
| 2017/0168485 A1 | 6/2017 | Berntorp et al. |
| 2018/0150081 A1 | 5/2018 | Gross et al. |
| 2018/0164822 A1 | 6/2018 | Chu et al. |
| 2018/0261093 A1 | 9/2018 | Xu et al. |
| 2018/0330618 A1 | 11/2018 | Bai et al. |
| 2018/0338229 A1* | 11/2018 | Nemec ............... G06Q 50/30 |
| 2019/0009787 A1* | 1/2019 | Ishioka ............. G08G 1/166 |
| 2019/0078896 A1 | 3/2019 | Zhu |
| 2019/0120640 A1* | 4/2019 | Ho ..................... G06Q 50/30 |
| 2019/0196485 A1 | 6/2019 | Li et al. |
| 2019/0235505 A1 | 8/2019 | Li et al. |
| 2019/0235506 A1 | 8/2019 | Bardapurkar et al. |
| 2019/0347515 A1* | 11/2019 | Kehl .................... G06N 3/08 |
| 2019/0391580 A1 | 12/2019 | Di Cairano et al. |
| 2020/0139959 A1 | 5/2020 | Akella et al. |
| 2020/0142417 A1 | 5/2020 | Hudecek |
| 2020/0398833 A1 | 12/2020 | Hudecek et al. |

FOREIGN PATENT DOCUMENTS

| | | |
|---|---|---|
| DE | 102016222782 A1 | 5/2018 |
| EP | 3709280 A1 | 9/2020 |

OTHER PUBLICATIONS

The PCT Search Report and Written Opinion dated Apr. 14, 2020, for PCT Application No. PCT/US2019/058760, 16 pages.

Bloomberg QuickTake, "Zoox/s $800M Robo Taxi Could Beat Tesla and Uber", retrieved on Nov. 5, 2020 at <<https://www.youtube.com/watch?v=OJDLwnTyybo>>, Youtube, Jul. 17, 2018, 1pp.

Office Action dated Oct. 2, 2020 for U.S. Appl. No. 16/566,828 "Dynamic Collision Checking" Hudecek, 18 pages.

The PCT Search Report and Written Opinion dated Nov. 20, 2020 for PCT Application No. PCT/US2020/050225, 33 pages.

Office Action for U.S. Appl. No. 16/179,711, dated Mar. 23, 2021, Akella, "Cost Scaling in Trajectory Generation", 33 pages.

\* cited by examiner

DYNAMIC LANE BIASING

RELATED APPLICATION

This application is a continuation-in-part of U.S. application Ser. No. 16/179,679, filed Nov. 2, 2018, the entirety of which is incorporated by reference herein.

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, generating a route may be computationally intensive and/or may not provide a safe or comfortable route for passengers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
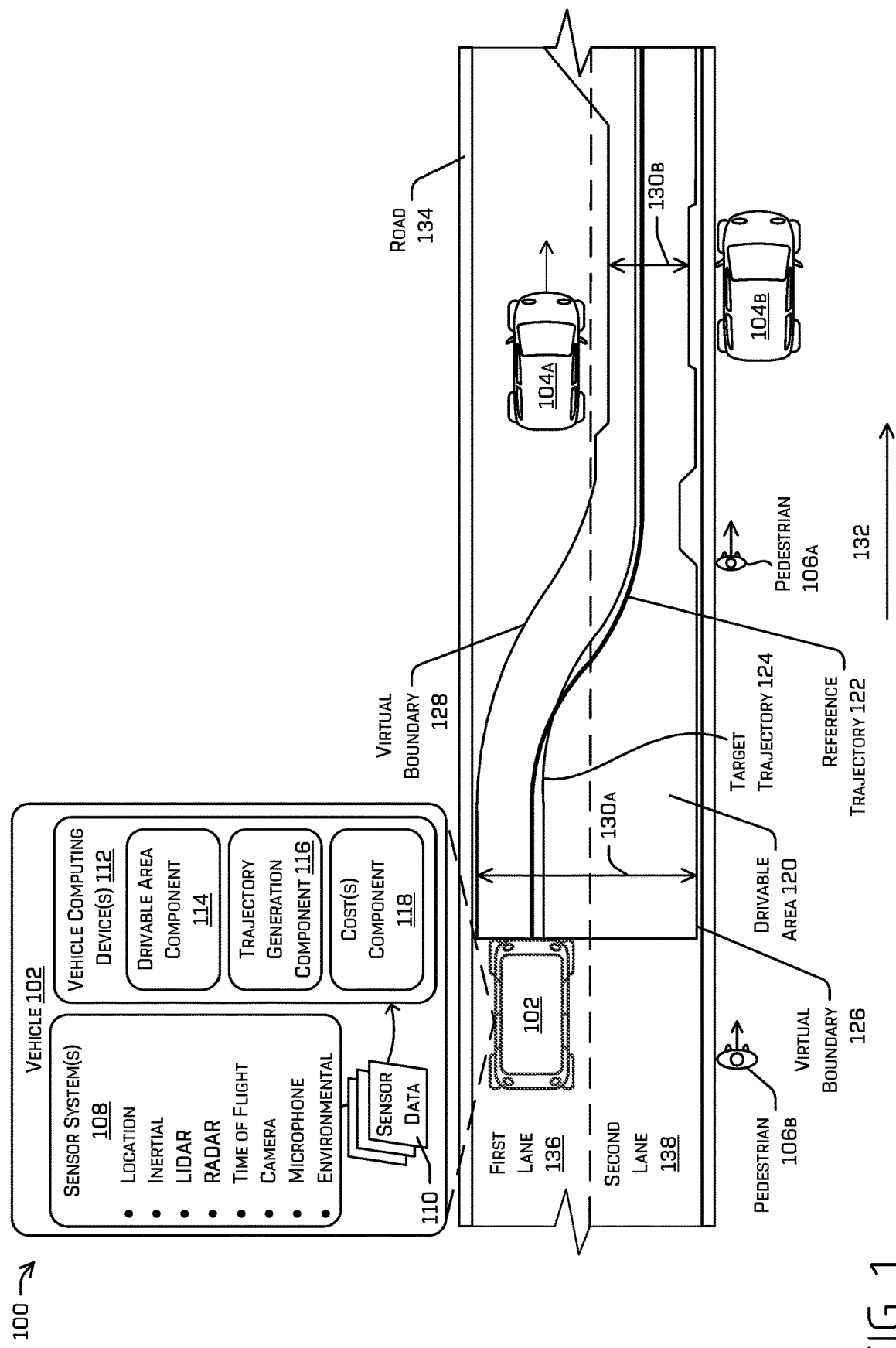
FIG. 1 is a schematic diagram illustrating an example implementation of a system for generating a trajectory, generating a drivable area, and evaluating costs, in accordance with embodiments of the disclosure.

As discussed above, generating a route for an autonomous vehicle through an environment may be computationally intensive and/or may not provide a safe or comfortable route for passengers. This application describes techniques for reducing a computational burden of planning a route through an environment, may improve an accuracy and precision of trajectory generation, and/or may improve safety and comfort of routes for passengers. For instance, the techniques described herein may reduce the computational burden by adaptively scaling a density of trajectory points (e.g., points along the trajectory used for determining associated costs and controls) based on the level of activity (e.g., cost(s) associated with curvature(s) and/or object(s)) along the route. By using a lower density of trajectory points for portions of the route that have lower activity (e.g., lower cost(s) associated with curvature(s) and/or fewer nearby object(s)), the computational intensity of trajectory generation can be reduced. Such costs as referred to herein may be, as non-limiting examples, proportional with respect to the curvature or distance, an L1, L2, quadratic, Huber, polynomial, exponential, function or the like, including any combination thereof. As another example, the techniques described herein may increase accuracy and/or precision of trajectory generation by using a relatively higher density of trajectory points for portions of the route that have higher activity (e.g., higher cost(s) associated with curvature(s) and/or more nearby object(s)). By way of another example, cost functions quantitatively balance goals of comfort, vehicle dynamics, safety, and the like. Techniques discussed herein include adaptively scaling weights associated with one or more costs to enhance safety and/or comfort when determining the contours of a trajectory through an environment. Further, regions establishing buffers around objects in an environment can be increased or decreased in size depending on a classification of an object (e.g., pedestrians, vehicles, etc.) and/or depending on a velocity of the autonomous vehicle in the environment.

This disclosure is directed to techniques for generating trajectories and drivable areas for navigating a vehicle in an environment. For example, an autonomous vehicle can receive a reference trajectory representing an initial path or trajectory for the autonomous vehicle to follow in an environment. A point density of points on the reference trajectory can be based at least in part on a cost associated with a curvature of the reference trajectory and/or on a cost associated with a distance between the reference trajectory and an obstacle in the environment. A weight associated with various costs can be based on triggers such as jumps or discontinuities in a reference trajectory or obstacle costs meeting or exceeding a threshold. Further, a drivable area can represent a region in the environment where the autonomous vehicle can travel. Boundaries of the drivable region can include information about object(s) in the environment and probabilistic distances between the boundaries and the object(s). In some examples, regions associated with the drivable area can be based on a classification of objects in the environment and/or on a velocity of the autonomous vehicle in the environment. A target trajectory can be generated with respect to the reference trajectory based at least in part on evaluating one or more costs at points on the reference trajectory relative to the drivable area, whereby a density of points on the reference trajectory and weights associated with cost(s) can be determined as discussed herein.

In some examples, a planning system of an autonomous vehicle can include one or more layers for generating and optimizing one or more trajectories for the autonomous vehicle to traverse an environment. For example, a first layer of the planning system can receive or determine a lane reference (also referred to as a reference trajectory), which may correspond to or be associated with a center of a road segment. Costs associated with points on the lane reference can be evaluated and optimized to generate a first target trajectory. For example, a state of the vehicle can be evaluated along each point on the lane reference (or reference trajectory) to evaluate changing states of the vehicle over time (e.g., sometimes referred to as a "rollout"). In some examples, the first target trajectory can be provided to a second layer of the planning system, whereby the first target trajectory is used as a reference trajectory. Costs associated with points on the reference trajectory can be evaluated and optimized to generate a second target trajectory. In some instances, the second target trajectory can be optimized further or can be used to control the autonomous vehicle. In some examples, the first layer can optimize the reference trajectory with respect to a distance between points and/or the second layer can optimize the reference trajectory with respect to a time between points, although other combinations are contemplated here.

In some examples, a reference trajectory representing an initial path or trajectory for an autonomous vehicle to follow can be generated or received by a computing device of the autonomous vehicle. In some examples, the reference trajectory can correspond to a centerline of a road segment, although the reference trajectory can represent any path in an environment. In some examples, points on the reference trajectory can be established, selected, sampled, or otherwise determined based at least in part on a cost associated with a curvature value associated with the reference trajectory and/or based at least in part on a cost associated with a distance between a point associated with a region of the reference trajectory and one or more obstacles in the environment. For example, a region associated with a relatively high curvature value may represent a maneuver around an obstacle in the environment or may represent a maneuver such as turning a corner, parking, and the like. By way of another example, a region of the reference trajectory can be relatively close to an obstacle in the environment. Accordingly, in the case of a high cost associated with a curvature and/or of a high cost associated with a distance to an obstacle, the region can be associated with a relatively higher point density of points on the reference trajectory. In some cases, one or more costs can be evaluated at the points on the reference trajectory to generate a target trajectory, whereby the autonomous vehicle can be controlled to follow the target trajectory. Accordingly, dynamically varying the density of points on the reference trajectory based on a cost associated with a curvature of the reference trajectory and/or based on a cost associated with a distance between the point on the reference trajectory and a point associated with an obstacle can affect an amount of downstream processing in connection with generating a target trajectory.

In some examples, a target trajectory can be generated with respect to the reference trajectory by evaluating one or more costs associated with points on the reference trajectory. In general, the one or more costs may include, but is not limited to a reference cost, an obstacle cost, a lateral cost, a longitudinal cost, and the like. Additional details of the one or more costs are provided below. Further, a cost can be associated with a weight that can increase or decrease a cost associated with a trajectory or a cost associated with a point of the trajectory. In some examples, the operations discussed herein can include decreasing a weight associated with a cost based on triggers such as discontinuities in a reference trajectory or one or more costs meeting or exceeding a threshold. By way of example, and without limitation, a weight associated with a reference cost (discussed below) can be decreased when the vehicle is navigating around a double-parked vehicle or while changing lanes. In some examples, a reference cost can comprise a cost associated with a difference between a point (also referred to as a reference point) on the reference trajectory and a corresponding point (also referred to as a point or a target point) on the target trajectory, whereby the difference represents one or more difference in a yaw, lateral offset, velocity, acceleration, curvature, curvature rate, and the like. In some examples, decreasing a weight associated with a reference cost can reduce a penalty associated with the target trajectory being located a distance away from the reference trajectory, which can provide smoother transitions leading towards safer and/or more comfortable vehicle operations. For example, decreasing the reference costs associated with a portion of the reference trajectory can lead to increasing a buffer between the vehicle and an obstacle in the environment.

In other examples, such as while changing lanes, selecting a weight for a reference cost can be combined with other checks to provide safe and comfortable vehicle dynamics. For example, during a lane change action a target trajectory can be checked to maintain a lateral displacement less than a threshold distance given a distance traveled forward by the vehicle and/or given a period of travel time. By way of example, and without limitation, a vehicle may be constrained to traveling 1 meter in a lateral direction for every 2 meters the vehicle travels in a forward direction, thereby reducing a sideways force during the lane change. By way of another example, and without limitation, the vehicle may further be constrained to traveling 1 meter in a lateral direction for a sliding window of time, such as two seconds. Of course, other distances and times are contemplated herein.

In some examples, an obstacle cost can comprise a cost associated with a distance between a point on the reference trajectory or the target trajectory and a point associated with an obstacle in the environment. By way of example, the point associated with the obstacle can correspond to a point on a boundary of a drivable area or can correspond to a point associated with the obstacle in the environment. In some examples, an obstacle in the environment can include, but is not limited to a static object (e.g., building, curb, sidewalk, lane marking, sign post, traffic light, tree, etc.) or a dynamic object (e.g., a vehicle, bicyclist, pedestrian, animal, etc.). In some examples, a dynamic object can also be referred to as an agent. In some examples, a static object or a dynamic object can be referred to generally as an object or an obstacle.

In some examples, a lateral cost can refer to a cost associated with steering inputs to the vehicle, such as maximum steering inputs relative to a velocity of the vehicle.

In some examples, a longitudinal cost can refer to a cost associated with a velocity and/or acceleration of the vehicle (e.g., maximum braking and/or acceleration).

As introduced above, the vehicle can determine a drivable area that represents a region in the environment where the vehicle can travel. In some examples, a computing device of an autonomous vehicle can receive sensor data captured by one or more sensors of the autonomous vehicle and can determine one or more objects in the environment and/or attributes of the one or more objects in the environment. In some examples, the autonomous vehicle can utilize the object(s) and/or the attributes of the object(s) to determine which object(s) should be included in determining extents of the drivable area. Accordingly, the autonomous vehicle can plan a trajectory (e.g., a reference trajectory and/or the target trajectory) within the extents of the drivable area.

In some examples, the drivable area can comprise a dilated region, a collision region, and/or a safety region. For example, the dilated region can be statically or dynamically generated with respect to a lane boundary to represent the largest extent of the drivable area, and can comprise information about object(s) in the environment and probabilistic distances between the boundaries and the object(s) and the reference and/or target trajectories. For example, the dilated region can represent a buffer associated with a boundary based at least in part on a distance (e.g., half of a width of a vehicle) plus some distance based on an uncertainty of sensor noise, which may be based at least in part on an object classification. Further, and in some examples, the collision region can represent a smaller drivable area than the dilated region (e.g., representing a greater distance between an obstacle and a boundary of the collision region) representing a region for the autonomous vehicle to avoid to further reduce a likelihood that the autonomous vehicle will collide with an object in the environment. In some examples, a cost associated with entering the collision region can be relatively high (relative to the safety region). In some examples, the safety region can represent a region smaller than the collision region and the dilated region to provide a buffer between the autonomous vehicle and the object in the environment. In some examples, a cost associated with entering the safety region can be lower than a cost associated with the collision region. In some examples, the collision region and/or the safety region can also be associated with information about object(s) in the environment and probabilistic distances between the boundaries and the object(s). In some examples, the autonomous vehicle can evaluate costs based at least in part on distance(s) between points on the reference trajectory and/or the target trajectory and one or more points associated with the regions, as discussed herein. In some examples, the cost(s) associated with the region(s) may vary. For example, a cost and/or weight associated with the safety region may be relatively less than a cost and/or weight associated with the collision region.

In some examples, a size of the region(s) can be based at least in part on a classification type of objects that the regions represent or are otherwise associated with in the environment. For example, a safety region associated with a pedestrian may be associated with a first distance or size and a safety region associated with a vehicle may be associated with a second distance or size that is different than the first distance or size. By way of example, and without limitation, a safety region associated with the pedestrian can be larger than a safety region associated with a vehicle, which may result in the autonomous vehicle giving a larger buffer to the pedestrian than to the vehicle, assuming other factors are the same.

In some examples, a size of the region(s) can be based at least in part on a velocity of the autonomous vehicle. For example, a safety region associated with a pedestrian may be associated with a first distance or size while the autonomous vehicle is traveling at a first velocity (or is predicted to travel at a reference point corresponding to the region) and may be associated with a second distance or size while the autonomous vehicle is traveling at a second velocity (or is predicted to travel at a reference point corresponding to the region) that is different than the first velocity. By way of example, and without limitation, a size of the safety region can be increased as the velocity of the autonomous vehicle increases, which may result in the autonomous vehicle giving a larger buffer to the pedestrian at a higher velocity, assuming other factors are the same.

The techniques discussed herein can improve a functioning of a computing device in a number of additional ways. In some cases, varying a density of points associated with the reference trajectory can reduce an amount of processing by increasing a density of points in regions of high interest or in regions with high activity and by decreasing a density of points in regions of low interest or low activity. Further, because additional processing steps, such as evaluating costs, are based on the points on the reference trajectory, reducing a number of points to consider can represent a large reduction in overall processing without sacrificing accuracy or precision. In some examples, selecting weights associated with a cost can result in safer trajectories (e.g., by increasing a distance between an object and a vehicle in the environment) and/or can result in more comfortable trajectories (e.g., by reducing lateral acceleration during a lane change action). In some examples, varying a size of regions associated with a drivable area can improve safety by generating and/or modifying the regions based on a classification type and/or a velocity of the autonomous vehicle. Further, the techniques discussed herein can be used alone or in combination to improve safety and/or comfort in a variety of systems that generate trajectories. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In another example, the techniques can be utilized in an aviation or nautical context. Additionally, the techniques described herein can be used with real data (e.g., captured using sensor(s)), simulated data (e.g., generated by a simulator), or any combination of the two.

FIG. 1 is a schematic diagram illustrating an example implementation of a system for generating a trajectory, generating a drivable area, and evaluating costs, in accordance with embodiments of the disclosure. More specifically, FIG. 1 illustrates an example environment 100 in which a vehicle 102 is positioned. In the illustrated example, the vehicle 102 is driving in the environment 100, although in other examples the vehicle 102 may be stationary and/or parked in the environment 100. One or more objects, or agents, also are in the environment 100. For instance, FIG. 1 illustrates additional vehicles 104a and 104b and pedestrians 106a and 106b in the environment 100. Of course, any number and/or type of objects can additionally or alternatively be present in the environment 100.

For the purpose of illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In the example of FIG. 1, the vehicle 102 can be associated with one or more sensor systems 108. The sensor system(s) 108 can generate sensor data 110, which can be utilized by vehicle computing device(s) 112 associated with the vehicle 102 to recognize the one or more objects, e.g., the vehicles 104 and the pedestrians 106. The sensor system(s) 108 can include, but is/are not limited to, light detection and ranging (LIDAR) sensors, radio detection and ranging (RADAR) sensors, Time of Flight sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), etc.

In at least one example, the vehicle computing device(s) 112 can include a perception system, which can perform object detection, segmentation, and/or classification based at least in part on the sensor data 110 received from the sensor system(s) 108. For instance, the perception system can detect the vehicles 104a and 104b and/or the pedestrians 106a and 106b in the environment 100 based on the sensor data 110 generated by the sensor system(s) 108. Additionally, the perception system can determine an extent of the vehicles 104a and 104b and/or the pedestrians 106a and 106b (e.g., height, weight, length, etc.), a pose of the vehicles 104a and 104b and/or the pedestrians 106a and 106b (e.g., x-coordinate, y-coordinate, z-coordinate, pitch, roll, yaw), etc. The sensor system(s) 108 can continuously generate the sensor data 110 (e.g., in near-real time), which can be utilized by the perception system (and other systems of the vehicle computing device(s) 112).

The vehicle computing device(s) 112 can also include a drivable area component 114, a trajectory generation component 116, and a cost(s) component 118. In some examples, although discussed separately, the trajectory generation component 116 and the cost(s) component 118 (and/or other components discussed herein) can be integrated into a single component or algorithm. In general, the drivable area component 114 can include functionality to generate and/or determine a drivable area 120, in accordance with the embodiments discussed herein. In general, the trajectory generation component 116 can include functionality to generate a reference trajectory 122 and/or a target trajectory 124 within the drivable area 120, in accordance with the embodiments discussed herein. In general, the cost(s) component can include functionality to evaluate one or more costs to generate the target trajectory 124 with respect to the reference trajectory 122.

In some examples, the drivable area 120 may be a virtual area in the environment 100 in which the vehicle 102 can travel safely through the environment 100, for example, relative to objects including the vehicles 104a, 104b and the pedestrians 106a, 106b.

As illustrated in FIG. 1 and detailed further herein, the drivable area 120 may be defined by virtual boundaries 126 and 128. In the example drivable area 120 illustrated in FIG. 1, the drivable area 120 may have a variable width 130, for example, in the width or lateral direction of the vehicle 102. FIG. 1 illustrates a first width 130a and a second width 130b, which collectively, and along with other widths at other positions in the drivable area 120, may be referred to as the width 130. As described herein, attributes of the virtual boundaries 126 and 128, including the width 130, may be determined based at least in part on the sensor data 110 and/or determinations made by the perception system. For example, in some implementations, the virtual boundaries 126 and 128 may be determined based on information about the objects in the environment 100, which may include information about semantic classifications and/or probabilistic models. In at least some examples, the virtual boundaries 126 and 128 may be encoded with information (such as lateral distance to the nearest object, semantic classification of the nearest object, related probabilities of such distance and classification, etc.). In some examples, the drivable area 120 can be generated in accordance with the techniques discussed in U.S. patent application Ser. No. 15/982,694, filed May 17, 2018, which is hereby incorporated by reference, in its entirety.

As also illustrated in FIG. 1, upon determining the drivable area 120, the vehicle computing device(s) 112 also may determine a reference trajectory 122 along which the vehicle 102 may travel through the environment 100. The planner system can determine routes and/or trajectories to use to control the vehicle 102 based at least in part on the sensor data 110 received from the sensor system(s) 108 and/or any determinations made by the perception system. For instance, the planning system can evaluate one or more costs to generate the target trajectory 124 with respect to the reference trajectory 122 to navigate safely through the environment relative to the vehicle 104a, 104b and the pedestrians 106a, 106b.

More specifically, FIG. 1 illustrates a scenario in which the vehicle 102 is travelling through the environment 100, generally in the direction of arrow 132. The vehicle 102 is travelling on a road 134 having a first lane 136 and a second lane 138. The vehicle 102 is in the first lane 136, behind the vehicle 104a, and, in the example, is travelling relatively faster than the vehicle 104a. For example, the vehicle 104a may be slowing down to turn left, to parallel park on the left side of the road 134, to drop off a passenger or delivery on the left shoulder of the road, or the like. In examples of this disclosure, the vehicle 102, for example, by executing the drivable area component 114, may determine the drivable area 120 as a precursor to determining whether the vehicle 102 can safely navigate around the slowing vehicle 104a. More specifically, the vehicle computing device(s) 112, using the sensor data 110, may determine information about objects in the environment 100, which may include the vehicle 104a, the vehicle 104b, the pedestrian 106a, the pedestrian 106b, and/or additional objects. For example, the vehicle computing device(s) 112, using the drivable area component 114, may fuse or combine information about each of the objects to configure the drivable area 120. Such a drivable area 120 may, in turn, be used to determine the reference trajectory 122 and/or the target trajectory 124 (e.g., by providing constraints and/or boundaries) along which the vehicle 102 may travel. In some examples, the reference trajectory 122 can be generated prior to or substantially simultaneously (within technical tolerances) as the drivable area 120.

With further reference to FIG. 1, the drivable area 120 may have varying widths, for example, the first width 130a and a second width 130b, and those widths are determined at least in part based on information about the objects in the environment 100. For example, at a position immediately in front of the vehicle 102 in the direction illustrated by arrow 132, the first width 130a generally spans the entire width of the road 134. At edges of the first lane 136 and the second lane 138, a slight offset relative to the shoulder may be provided, although such an offset may be excluded in other embodiments. Further along the road 134 in the direction of the arrow 132, the drivable area 120 begins to narrow as the virtual boundary 128 gradually moves away from the left shoulder until the drivable area 120 is completely confined in the right lane (second lane 138). This narrowing of the drivable area 120 is a result of the presence and/or the relative deceleration of the vehicle 104a. Moreover, immediately adjacent the vehicle 104a, the drivable area 120 may further narrow, for example, to provide a minimum lateral offset relative to the vehicle 104a. Similarly, on the right side of the drivable area 120, offsets may be provided proximate the pedestrian 106a and the vehicle 104b, which is parked on the right shoulder of the road 134. In some examples, such a drivable area 120 may also be determined based on a predicted trajectory of objects, such as that of the pedestrian 106a. As a non-limiting example depicted in FIG. 1, the drivable area 120 indents slightly near the pedestrian 106a in anticipation of the pedestrian 106a continuing walking in the direction of travel (e.g., direction of the arrow 132). The length of such an indent may be based on, for example, the velocities of the vehicle 102 and the pedestrian 106a.

As described further herein, the width 130 of the drivable area 120 varies as a result of information about objects in the environment 100. Thus, for example, offsets are provided proximate the vehicle 104a, the vehicle 104b, and the pedestrian 106a. These offsets may serve to provide a safety margin or minimum distance of the vehicle 102 from the objects, as the vehicle 102 travels in the drivable area 120. In some implementations, the offsets and/or the minimum distances may differ among and between objects in the environment 100. For example, semantic information about the objects may be used to determine appropriate offsets. Thus, in FIG. 1, pedestrians may be associated with a first classification and vehicles may be associated with a second classification. The first classification may correspond to a minimum offset larger than a minimum offset to which the second classification corresponds. Moreover, vehicles within the second classification may be further classified as static, as in the case of the vehicle 104b or dynamic, as in the case of the vehicle 104a. An offset relative to the moving vehicle 104a may be greater than the offset associated with the parked vehicle 104b, for example. In further examples, probabilistic information about the objects may also or alternatively be used to determine the offsets. For example, there may be some uncertainty associated with the actions of the moving pedestrian 106a and/or the moving vehicle 104a, for example, because the pedestrian 106a or the driver of the vehicle 104a may change course. Probabilistic information may also be used to account for sensor inaccuracies, for example, associated with the sensor system(s) 108.

The drivable area 120 may allow for more efficient navigation around the vehicle 104a when compared with conventional navigation techniques. In conventional solutions, for example, the vehicle 102 may slow down as it approaches the vehicle 104a, for example, to maintain a minimum distance between the vehicle 102 and the vehicle 104a, and only upon stopping or slowing to a threshold speed may the vehicle 102 begin to seek out an alternative route around the vehicle 104a. Alternatively, the vehicle 102 may idle in the first lane 136 until the vehicle 104a turns, parks, moves, accelerates, or the like. However, in implementations of this disclosure, the drivable area 120 considers multiple objects as well as information about the objects to provide a more robust understanding of the environment 100. This understanding may enhance decision making and/or allow for more effective and efficient control of the vehicle 102 as it travels through the environment 100. With specific regard to FIG. 1, such enhanced decision-making may allow the vehicle to traverse along the target trajectory 124, without the need to slow down behind the vehicle 104a and/or await additional decision making. Further, the drivable area 120 provides boundaries for a wide range of possible trajectories which may be employed to safely navigate a portion of a path. By providing such a wide range of safe trajectories, the vehicle 102 is able to quickly overcome any hazards, while incorporating information about all objects in a scene.

FIG. 1 illustrates a single example of using a drivable area to navigate in an environment. Myriad other examples also are contemplated. For example, the drivable area component 114 may be used in any environment to better navigate with respect to objects.

Figure 2:
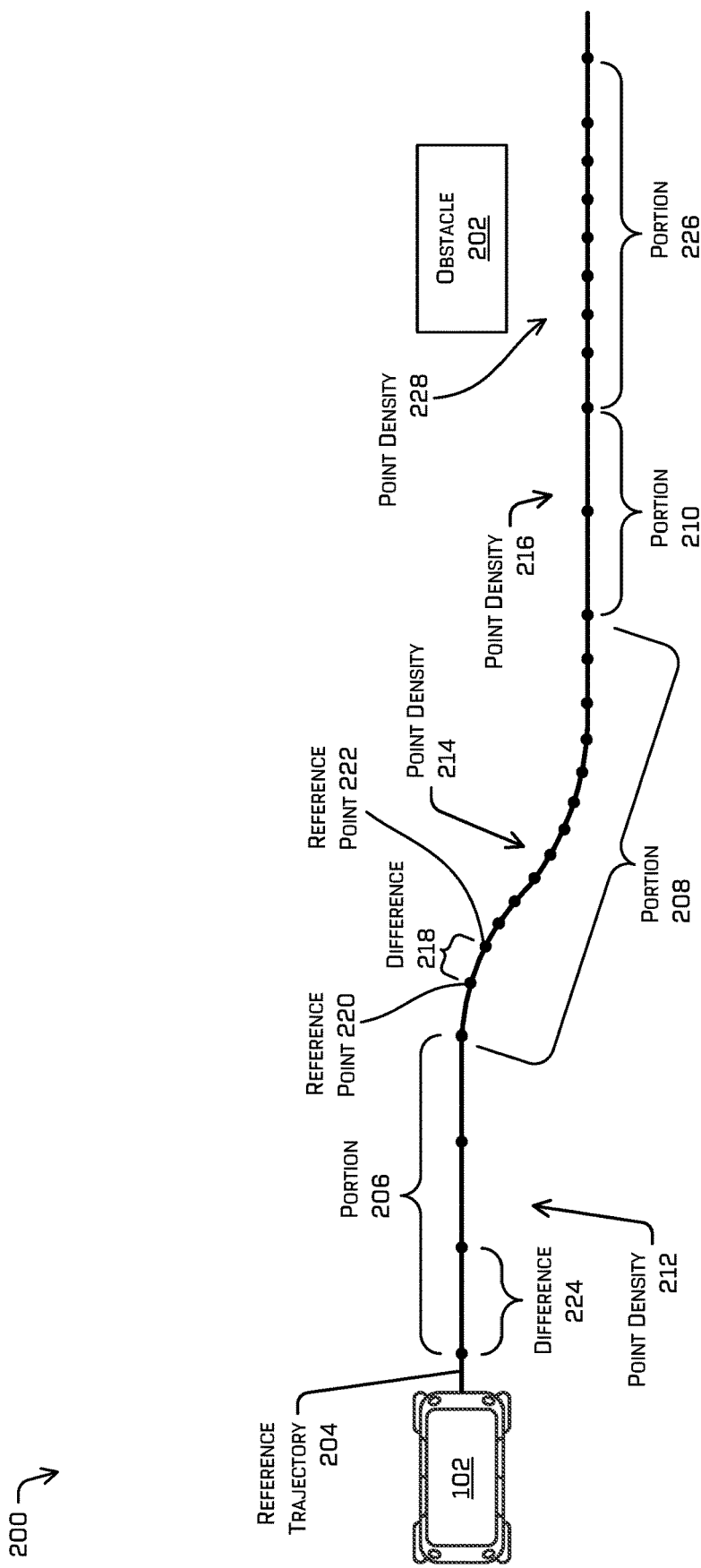
FIG. 2 is an illustration of a reference trajectory comprising regions of differing point densities, in accordance with embodiments of the disclosure.

FIG. 2 is an illustration of a reference trajectory comprising regions of differing point densities, in accordance with embodiments of the disclosure. More specifically, FIG. 2 illustrates an example environment 200 in which the vehicle 102 is positioned. FIG. 2 further illustrates an obstacle 202 in the environment 200, whereby a reference trajectory 204 represents an initial path for the vehicle 102 to navigate around the obstacle 202 in the environment 200. In some examples, the obstacle 202 corresponds to the vehicle 104a of FIG. 1, although the obstacle 202 may represent any static object or dynamic object in the environment 200. Further, the reference trajectory 204 may correspond to the reference trajectory 122 of FIG. 1, although the reference trajectory 204 may represent any path or trajectory in the environment 200.

In some examples, the trajectory generation component 116 (or another component of the vehicle computing device(s) 112) can determine a density of points associated with various regions of the reference trajectory 204. By way of example and without limitation, the vehicle computing device(s) 112 can identify region(s) of the reference trajectory 204 corresponding to regions of interest or corresponding to regions of high activity. In some examples, the region(s) can be identified based at least in part on a cost associated with a curvature value associated with the reference trajectory 204 and/or based at least in part on a cost associated with a distance between a point on the reference trajectory 204 and a distance to a point associated with an obstacle in the environment 200.

As illustrated, the reference trajectory 204 includes portions 206, 208, 210, and 226, although the reference trajectory 204 can include any number of portions.

The portion 206 can be associated with a point density 212, the portion 208 can be associated with a point density 214, the portion 210 can be associated with a point density 216, and the portion 226 can be associated with a point density 228.

In some examples, the point density 214 can be higher than the point density 212 and/or 216 because a cost associated with a curvature value associated with the portion 208 is higher than a curvature value associated with the portions 206 and/or 210. In some examples, the point density 228 can be higher than the point density 212 and/or 217 because a cost associated with a distance between the portion 226 and the obstacle 202 is smaller than a distance between the portions 206, 210 and the obstacle 202. That is, the point density 214 associated with the portion 208 can be based at least in part on a cost associated with a curvature value associated with the portion 208 and the point density 228 associated with the portion 226 can be based at least in part on a cost associated with a distance between the portion 226 and the obstacle 202.

In some examples, the point density 214 can correspond to a density of points in space or time. For example, as discussed above, a first layer of a planning system may optimize a trajectory based on a distance (which may be a Euclidian distance, length along an inertial reference, etc.) between points while a second layer of a planning system may optimize the trajectory based on a time period between points, or vice versa. In some examples, the difference 218 between adjacent reference points 220 and 222 can represent a distance in space (e.g., 5 cm, 10 cm, 50 cm, 1 m, and the like) or a distance in time (e.g., 0.05 seconds, 0.1 seconds, 0.2 seconds, 0.5 seconds, 1 second, and the like). In an example where the point density 214 is higher than the point density 212, the difference 218 between the adjacent reference points 220 and 222 can be smaller than a difference 224 between adjacent reference points associated with the portion 206.

As can be understood in the context of this disclosure, one or more costs can be evaluated at discrete points on the reference trajectory 204 to generate a target trajectory that the vehicle 102 can follow to traverse through the environment 200.

Figure 3:
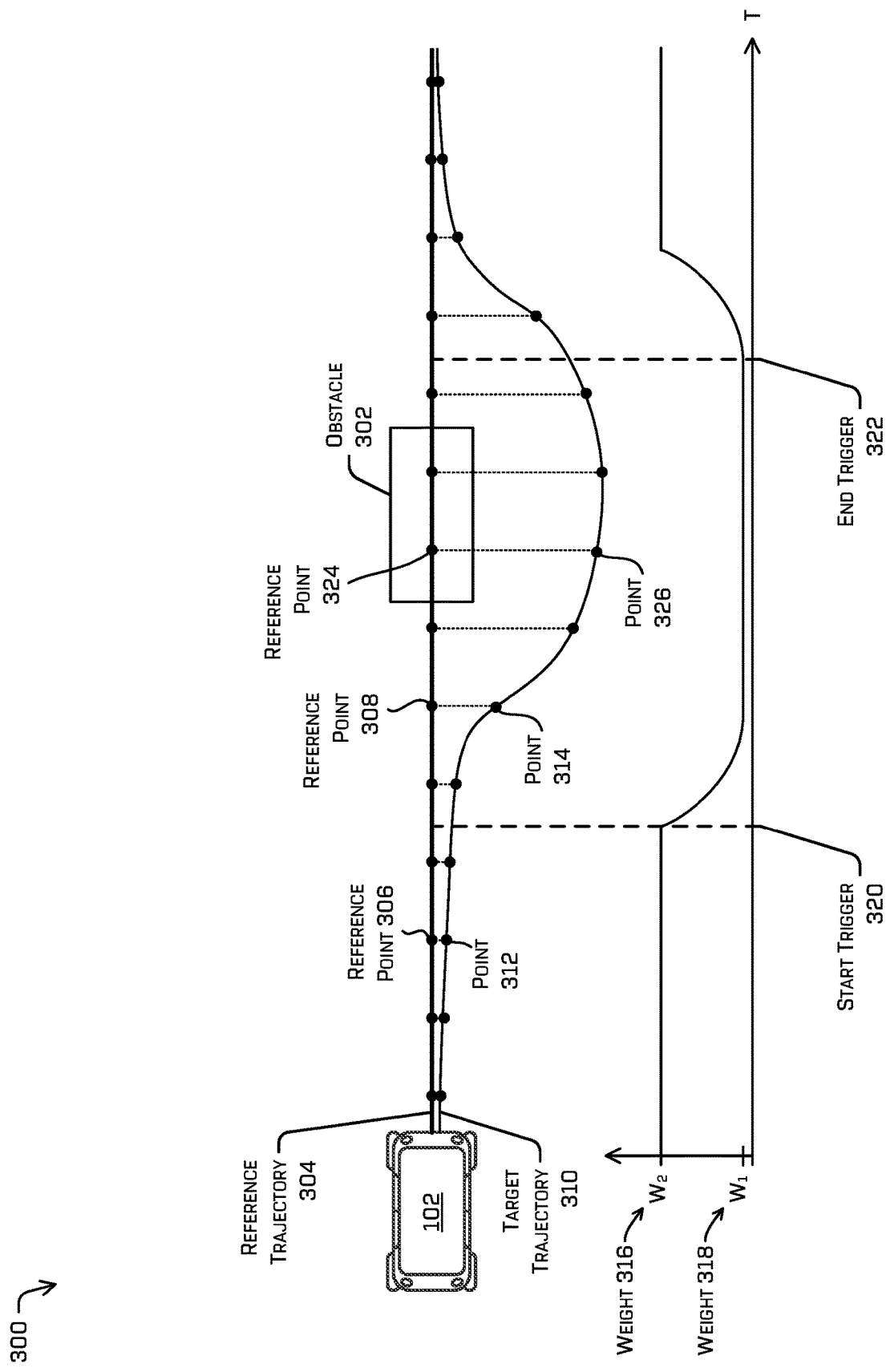
FIG. 3 is an illustration of determining weight(s) for a cost associated with generating a target trajectory based on a reference trajectory when navigating around an obstacle, in accordance with embodiments of the disclosure.

FIG. 3 is an illustration of determining weight(s) associated with a cost associated with generating a target trajectory based on a reference trajectory when navigating around an obstacle, in accordance with embodiments of the disclosure. More specifically, FIG. 3 illustrates an example environment 300 in which the vehicle 102 is positioned. FIG. 3 further illustrates an obstacle 302 in the environment 300, whereby a reference trajectory 304 represents an initial path for the vehicle 102 to navigate around the obstacle 302 in the environment 200. In some examples, the reference trajectory 304 can correspond to a maneuver for the vehicle 102 to navigate around a double-parked vehicle in the environment 300. In some examples, the obstacle 302 may represent any static object or dynamic object in the environment 300. Further, the reference trajectory 304 may represent any path in the environment 300.

In general, the vehicle computing device(s) 112 can evaluate one or more costs at reference points 306 and 308 to generate a target trajectory 310 having points 312 and 314 corresponding to the reference points 306 and 308, respectively. A dotted line between points on the reference trajectory 304 and the target trajectory 310 indicates corresponding points. In some cases, each point on the reference trajectory 304 can be associated with a corresponding point on the target trajectory 310, although in some cases the target trajectory 310 can be associated with points that do not necessarily correspond to point(s) on the reference trajectory. In some cases, a point (e.g., the points 312, 314, and 326) on the target trajectory 310 can be orthogonal to a corresponding reference point (e.g., the reference points 306, 308, and 324, respectively) on the reference trajectory 304, based at least in part on a curvature value at the reference trajectory 304.

In general, the one or more costs may include, but is not limited to a reference cost, an obstacle cost, a lateral cost, a longitudinal cost, and the like. A cost can be associated with a weight (e.g., weights 316 and 318) that can increase or decrease a cost associated with a trajectory or a cost associated with a point of the trajectory. In some examples, the vehicle computing device(s) 112 can perform operations to decrease a weight associated with a cost based on actions or maneuvers to be performed by the vehicle.

A start trigger 320 can represent a condition causing weights associated with cost(s) to be varied, as discussed herein. In some examples, a trigger can correspond to obstacle costs meeting or exceeding a threshold (e.g., discussed in context of FIG. 3) and/or jumps or discontinuities in a reference trajectory (e.g., discussed in the context of FIG. 4). For example, during an operation to evaluate initial costs associate with reference points on the reference trajectory 304, an obstacle cost associated with a reference point 324 may meet or exceed a threshold cost by virtue of the reference point 324 being located within the obstacle 302. Accordingly, the start trigger can be initiated along the reference trajectory 304 based at least in part on a distance or time in relation to the reference point 324. An end trigger 322 can represent a period of time or distance associated with the cost(s) (e.g., an obstacle cost) associated with the reference trajectory 304 being below a threshold value. Based at least in part on the start trigger 320 and the end trigger 322, a weight associated with the points of the reference trajectory 304 and/or the target trajectory 310 can be adjusted to increase or decrease the weights. For example, a weight associated with the reference point 306 can correspond to the weight 316 and a weight associated with the reference point 308 can correspond to the weight 318. Accordingly, evaluating costs associated with the points 306 and 308 can be based at least in part on the weights 316 and 318, respectively. By reducing the weight associated with the reference cost when passing the obstacle 302, the vehicle is better able to explore trajectories which may be further from the reference trajectory 304 to overcome the obstacle 302. By way of example, a point 326 corresponding to the reference point 324 is allowed to be located further from the reference point 324 to safely overcome the obstacle 302.

In some examples, the weights associated with the reference points 306, 308, and 324 can be used to determine the points 312, 314, and 326 respectively, and accordingly, can determine the contours of the target trajectory 310. By way of example, and without limitation, a weight associated with a reference cost can be decreased when the vehicle is navigating around the obstacle 302. In some examples, a reference cost can comprise a cost associated with a difference between a point (e.g., the reference point 308) on the reference trajectory 304 and a corresponding point (e.g., the point 314) on the target trajectory 310. In some example, the difference can represent one or more difference in a yaw, lateral offset, velocity, acceleration, curvature, curvature rate, and the like. In some examples, decreasing a weight associated with a reference cost can reduce a penalty associated with the target trajectory 310 being located a distance away from the reference trajectory 304, which can provide smoother transitions leading towards safer and/or more comfortable vehicle operations. For example, decreasing the reference costs associated with a portion of the reference trajectory 304 associated with the start trigger 320 and the end trigger 322 can lead to increasing a buffer between the vehicle 102 and the obstacle 302 in the environment 300 and/or otherwise allowing the vehicle 102 to explore trajectories not previously available.

Figure 4:
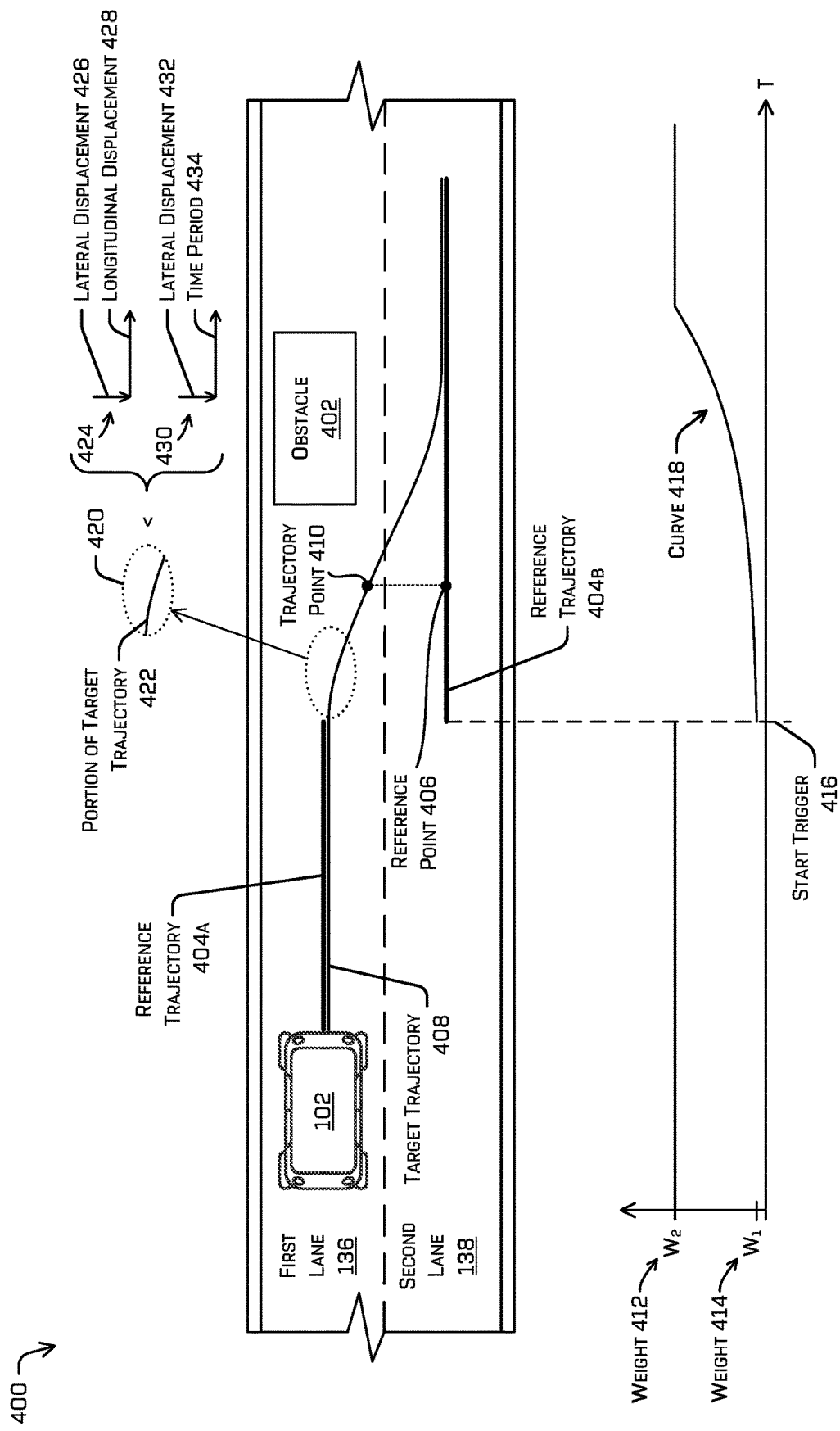
FIG. 4 is an illustration of determining weight(s) for a cost associated with generating a target trajectory based on a reference trajectory when changing lanes, in accordance with embodiments of the disclosure.

FIG. 4 is an illustration of determining weight(s) associated with a cost associated with generating a target trajectory based on a reference trajectory when changing lanes, in accordance with embodiments of the disclosure. More specifically, FIG. 4 illustrates an example environment 400 in which the vehicle 102 is positioned. FIG. 4 further illustrates an obstacle 402 in the environment 400, whereby a reference trajectory 404 (comprising portions 404A and 404B) represents an initial path or trajectory for the vehicle 102 to change lanes to navigate around the obstacle 402 in the environment 400. In some examples, the obstacle 402 corresponds to the vehicle 104a of FIG. 1, although the obstacle 402 may represent any static object or dynamic object in the environment 200. Further, the reference trajectory 404 may represent an alternative implementation compared to the reference trajectory 122 of FIG. 1 (e.g., representing a lane change action from the first lane 136 to the second lane 138). However, the reference trajectory 404 may represent any path or trajectory in the environment 400.

In general, the vehicle computing device(s) 112 can evaluate one or more costs at a reference point 406 to generate a target trajectory 408 having a trajectory point 410 corresponding to the reference point 306. A dotted line between the reference point 406 and the trajectory point 410 indicates a corresponding point. Although only one point on the reference trajectory 404 is shown in FIG. 4, it can be understood that a plurality of points on the reference trajectory 404 can correspond to a plurality of corresponding points on the target trajectory 408.

In general, the one or more costs may include, but is not limited to a reference cost, an obstacle cost, a lateral cost, a longitudinal cost, and the like. A cost can be associated with a weight (e.g., weights 412 and 414) that can increase or decrease a cost associated with a trajectory or a cost associated with a point of the trajectory. In some examples, the vehicle computing device(s) 112 can perform operations to decrease a weight associated with a cost based on actions or maneuvers to be performed by the vehicle.

A start trigger 416 can represent a jump or discontinuity of the reference trajectory 404, which can represent a lane change action to change from the first lane 136 to the second lane 138 in the environment 400. A curve 418 can represent the varying weight(s) of cost(s) over the reference trajectory 404B, whereby a shape of the curve 418 can be adjusted based on a lateral distance for the vehicle 102 to traverse with respect to a distance and/or time. Based at least in part on the start trigger 416 and the curve 418, a weight associated with the points of the reference trajectory 404 and/or the target trajectory 408 can be adjusted to increase or decrease the weight. In some examples, the curve 418 can represent a linear function, quadratic function, stepwise function, and the like, associated with the weight. For example, a weight associated with the reference point 406 can correspond to the weight 414. Accordingly, evaluating cost(s) associated with the reference point 406 can be based at least in part on the weight 414. Of course, evaluating the costs can be performed for a plurality of points associated with a plurality of weights, as discussed herein.

In some examples, a lane change action can be associated with other constraints to provide a smooth and comfortable behavior of the vehicle 102. For example, a detail of the target trajectory 408 is illustrated as a detail 420 of a portion of the target trajectory 422. In an example 424, the vehicle computing device(s) 112 can determine whether a lateral displacement 426 of the vehicle 102 is less than a threshold amount given a longitudinal displacement 428. By way of example and without limitation, the lateral displacement 426 may be 1 meter (or N meters) and the longitudinal displacement 428 may be 5 meters (or M meters). In an example 430, the vehicle computing device(s) 112 can determine whether a lateral displacement 432 of the vehicle 102 is less than a threshold amount given a time period 434. By way of example and without limitation, the lateral displacement 432 may be 1 meter (or N' meters) and the longitudinal displacement 428 may be 2 seconds (or S seconds). In some examples, a shape of the curve 418 can be adjusted (e.g., to vary weights more or less rapidly) to ensure that the lateral displacement 426 and 432 of the vehicle 102 is below a threshold. Thus, in some examples, the vehicle computing device(s) 112 can vary weight(s) associated with cost(s) and can ensure that a lateral displacement of the vehicle 102 is less than a threshold amount given a distance to travel and given a time period to determine the target trajectory 408 for the vehicle 102 to follow as the vehicle 102 traverses the environment 400.

Figure 5A:
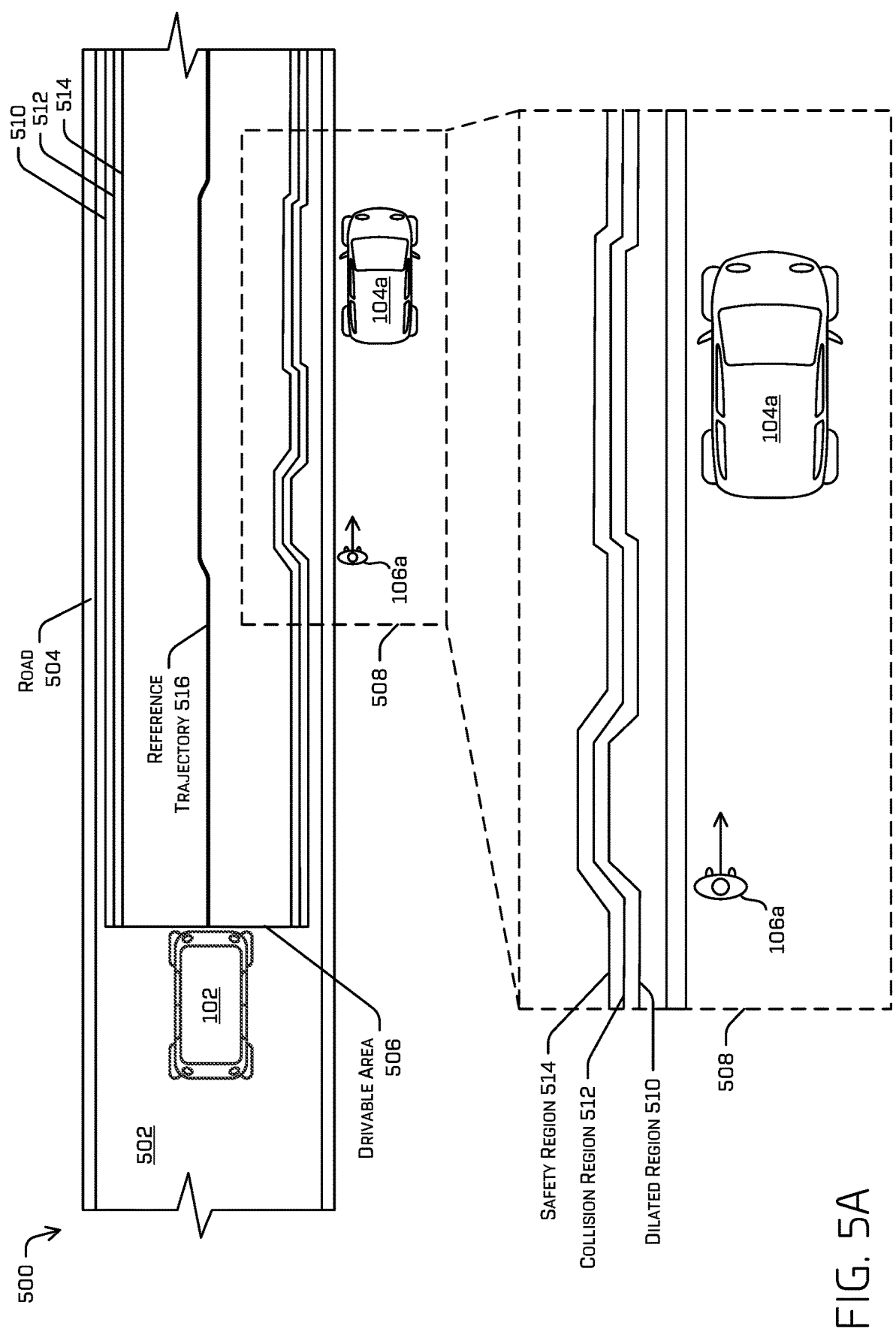
FIG. 5A is an illustration of a dilated region, a collision region, and a safety region associated with a drivable area, in accordance with embodiments of the disclosure.

FIG. 5A is an illustration of a dilated region, a collision region, and a safety region associated with a drivable area, in accordance with embodiments of the disclosure. In particular, FIG. 5 illustrates an example environment 500 in which the vehicle 102 is positioned in a lane 502 of a road 504. FIG. 5 further illustrates a pedestrian 106a traversing the environment 500 and the vehicle 104a parked on the side of the road 504.

In some examples, the vehicle computing device(s) 112 can determine a drivable area 506 comprising a plurality of regions, as illustrated in a detail 508. In particular, the drivable area 506 comprises a dilated region 510, a collision region 512, and a safety region 514. For example, the dilated region 510 can represent the largest extent of the drivable area 506 and can comprise information about object(s) (e.g., pedestrian 106a and vehicle 104a) in the environment 500 and probabilistic distances between the boundaries (e.g., defined by the regions 510, 512, and 514) and the object(s). As a non-limiting example, uncertainties from measurement and/or movement of the object(s) may be effectively "encoded" into such boundaries. Further, and in some examples, the collision region 512 can represent a drivable region smaller than the dilated region 510 representing a region for the vehicle 102 to avoid to further reduce a likelihood that the vehicle 102 will collide with the pedestrian 106a and the vehicle 104a in the environment 500. In some examples, the safety region 514 can represent a drivable region smaller than the collision region 512 and the dilated region 510 to provide a buffer between the vehicle 102 and the pedestrian 106a and the vehicle 104a in the environment 500. In some examples, the collision region 512 and/or the safety region 514 can also be associated with information about object(s) in the environment and probabilistic distances between the boundaries and the object(s). In some examples, the vehicle 102 can evaluate costs based at least in part on distance(s) between points on a reference trajectory 516 (and/or on a target trajectory) and one or more points associated with the regions 510, 512, and/or 516, as discussed herein. In some examples, the cost(s) associated with the region(s) 510, 512, and 514 may vary. For example, a cost associated with the safety region 514 may be relatively less than a cost associated with the collision region 512, and vice versa.

Figure 5B:
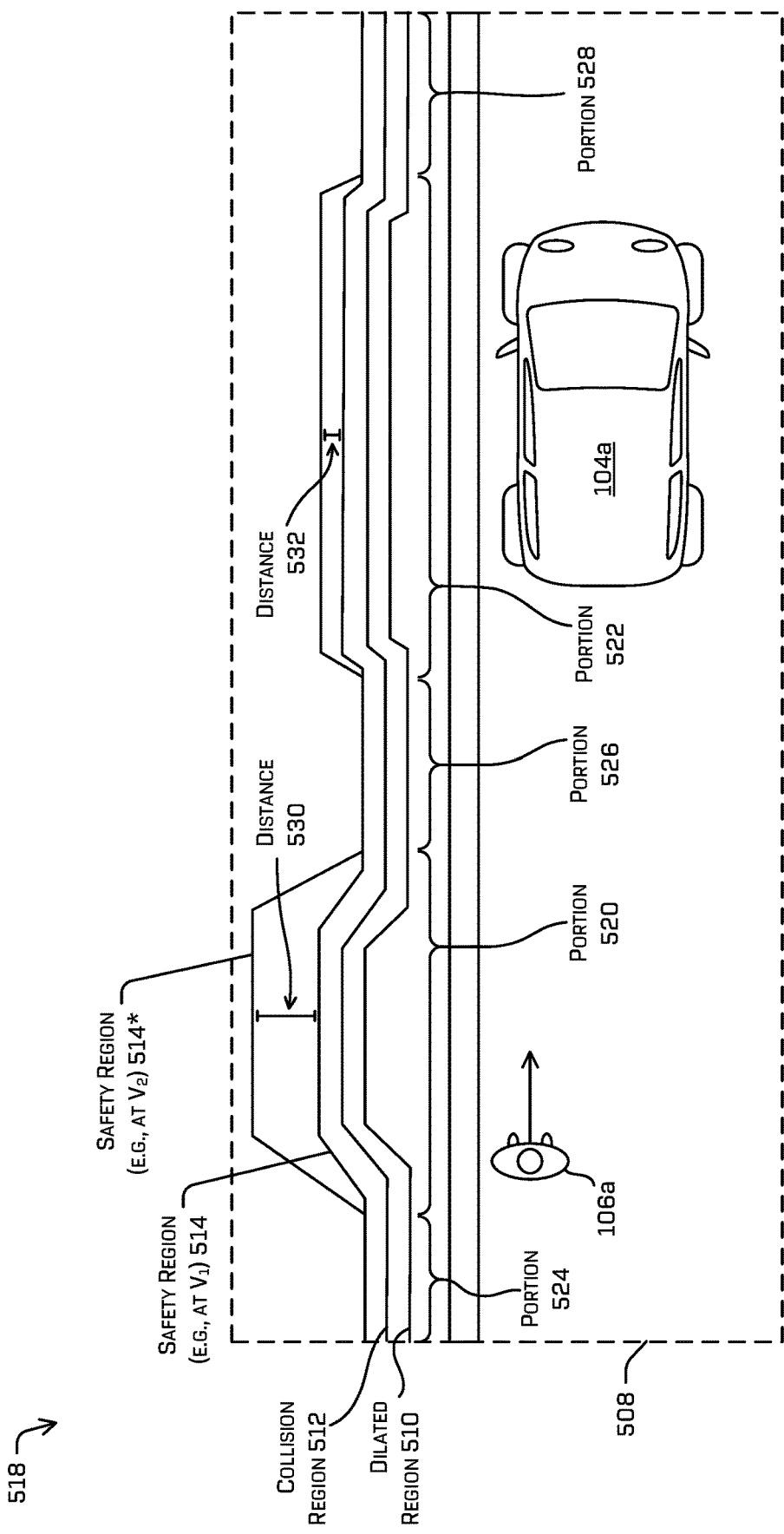
FIG. 5B is an illustration of regions associated with a drivable area based at least in part on a classification of an object in an environment and/or on a velocity of a vehicle in the environment, in accordance with embodiments of the disclosure.

FIG. 5B is an illustration of regions associated with a drivable area based at least in part on a classification of an object in an environment and/or on a velocity of a vehicle in the environment, in accordance with embodiments of the disclosure. An example 518 illustrates the detail 508 of FIG. 5A with the dilated region 510, the collision region 512, and the safety region 514.

For example, the safety region 514 represents a safety region while the vehicle 102 is associated with a velocity $V_1$.

By way of another example, the safety region 514* represents a safety region while the vehicle 102 is associated with a velocity $V_2$. As the safety regions 514 and 514* can be associated with information about object(s) in the environment 500 (e.g., classification information) and probabilistic distances between the boundaries and the object(s), a size of different portions of the safety regions 514 and 514* can vary based on classification information of the different portions and a velocity of the vehicle 102. For example, a portion 520 can represent a portion of the safety regions 514 and 514* associated with the pedestrian 106a, while the portion 522 can represent a portion of the safety regions 514 and 514* associated with the vehicle 104a. Portions 524, 526, and 528 may not be associated with the objects (e.g., pedestrian 106a or vehicle 104a), or may be associated with the extents of the road 504.

In some examples, a size of the safety regions 514 and 514* can be based at least in part on classification information of the associated object and/or on a velocity of the vehicle 102 in the environment. For example, a distance 530 associated with the portion 520 of the safety region 514* can represent an increase in a size of the safety region 514 for the portion associated with the pedestrian 106a while the vehicle 102 is at a velocity $V_2$. A distance 532 associated with the portion 522 of the safety region 514* can represent an increase in a size of the safety region 514 for the portion associated with the vehicle 104a while the vehicle 102 is at a velocity $V_2$. In some examples, the distance 530 can be larger than the distance 532. In some examples, the velocity $V_2$ can be higher than the velocity $V_1$. In some examples, varying a size of the safety regions 514 and 514* can further include modifying an extent of the drivable area to generate a modified drivable area.

In some examples, the portions 524, 526, and/or 528 of the safety region 514 that are not associated with the pedestrian 106a or the vehicle 104a may or may not change based on a velocity of the vehicle 102.

Figure 6A:
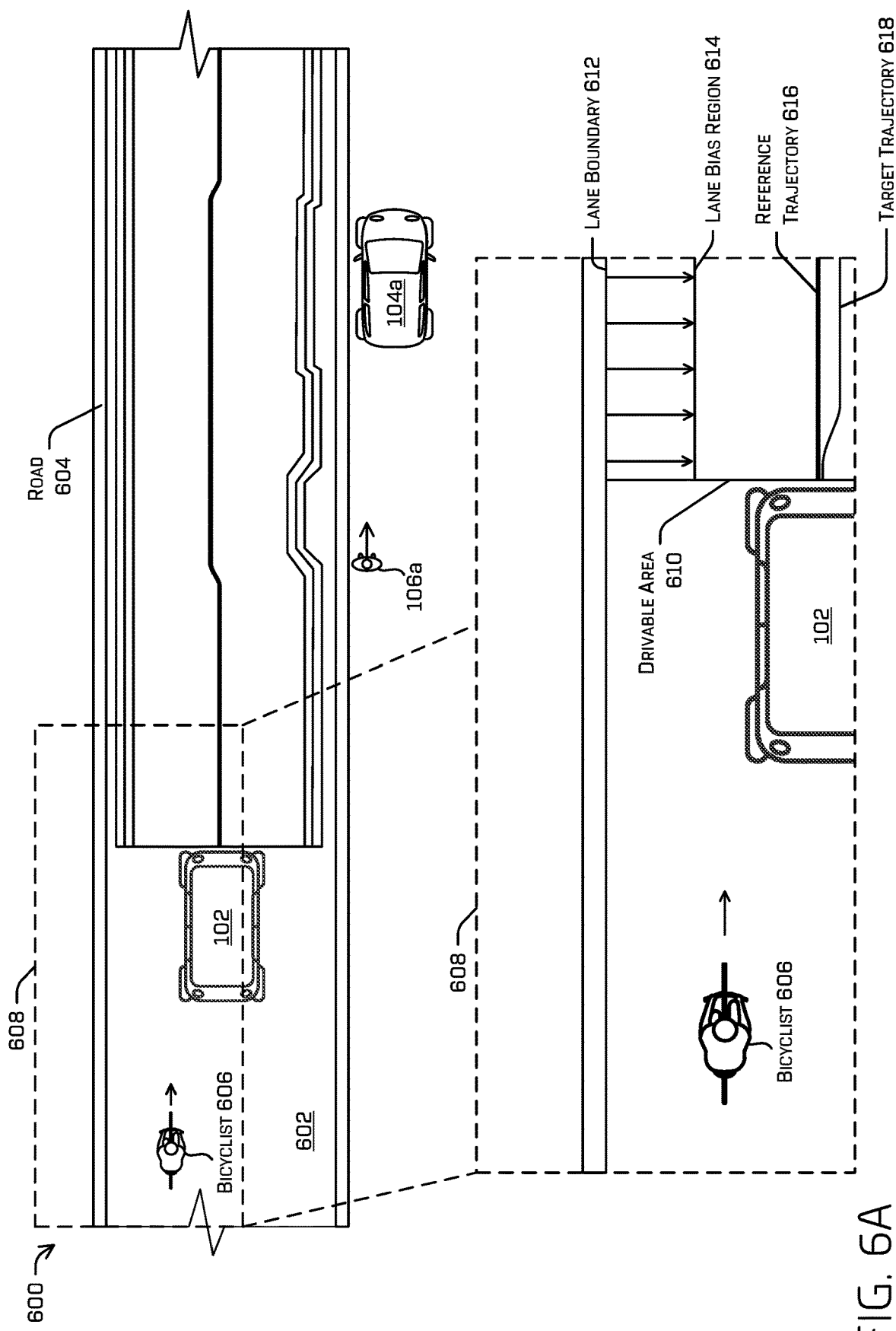
FIG. 6A is an illustration of updating a region based on identifying an object such as a bicyclist proximate to the vehicle, in accordance with embodiments of the disclosure.

FIG. 6A is an illustration of updating a region based on identifying an object such as a bicyclist proximate to the vehicle, in accordance with embodiments of the disclosure. In particular, FIG. 6A illustrates an example environment 600 in which the vehicle 102 is positioned in a lane 602 of a road 604. FIG. 6A further illustrates a pedestrian 106a traversing the environment 500, the vehicle 104a parked on the side of the road 604, and a bicyclist 606 (e.g., in a bicycle lane) proximate to the vehicle 102.

A detail 608 illustrates the vehicle 102, the bicyclist 606 proximate to the vehicle 102, and a drivable area 610 comprising a plurality of regions. For simplicity of discussion, a lane boundary 612 and a lane bias region 614 are illustrated in FIG. 6A, although it may be understood that additional regions may comprise a dilated region, a collision region, a safety region, and the like. In some examples, the vehicle computing device(s) 112 can determine the lane bias region 614 based at least in part on the bicyclist 606 (and/or a bicycle lane, parking lane, parked car, and the like) being proximate to the vehicle 102 in the environment 600.

For example, the vehicle computing device(s) 112 can determine a predicted trajectory for the bicyclist 606 to determine that the bicyclist 606 may pass the vehicle 102, and accordingly, can expand a size of the lane boundary 612 to generate the lane bias region 614. Accordingly, for a given reference trajectory 616, the vehicle computing device(s) 112 can generate a target trajectory 618 that biases a location of the vehicle 102 away from the bicyclist 606 (and/or bicycle lane) to allow the bicyclist to pass the vehicle 102 with more comfortable space. In some examples, a determination of whether to generate the lane bias region 614 can be based at least in part on one or more of a velocity of the bicyclist 606, a velocity of the bicyclist 606 relative to a velocity of the vehicle 102, a velocity of the vehicle 102 being below a threshold, a position of the bicyclist 606 in the lane 602 of the road 604, a position of the vehicle 102 and/or information from a map, and the like. In this manner, the vehicle computing device(s) 112 can evaluate cost(s) based on the lane bias region 614 to generate the target trajectory 618 that provides additional space for the bicyclist 606 to pass the vehicle 102.

Figure 6B:
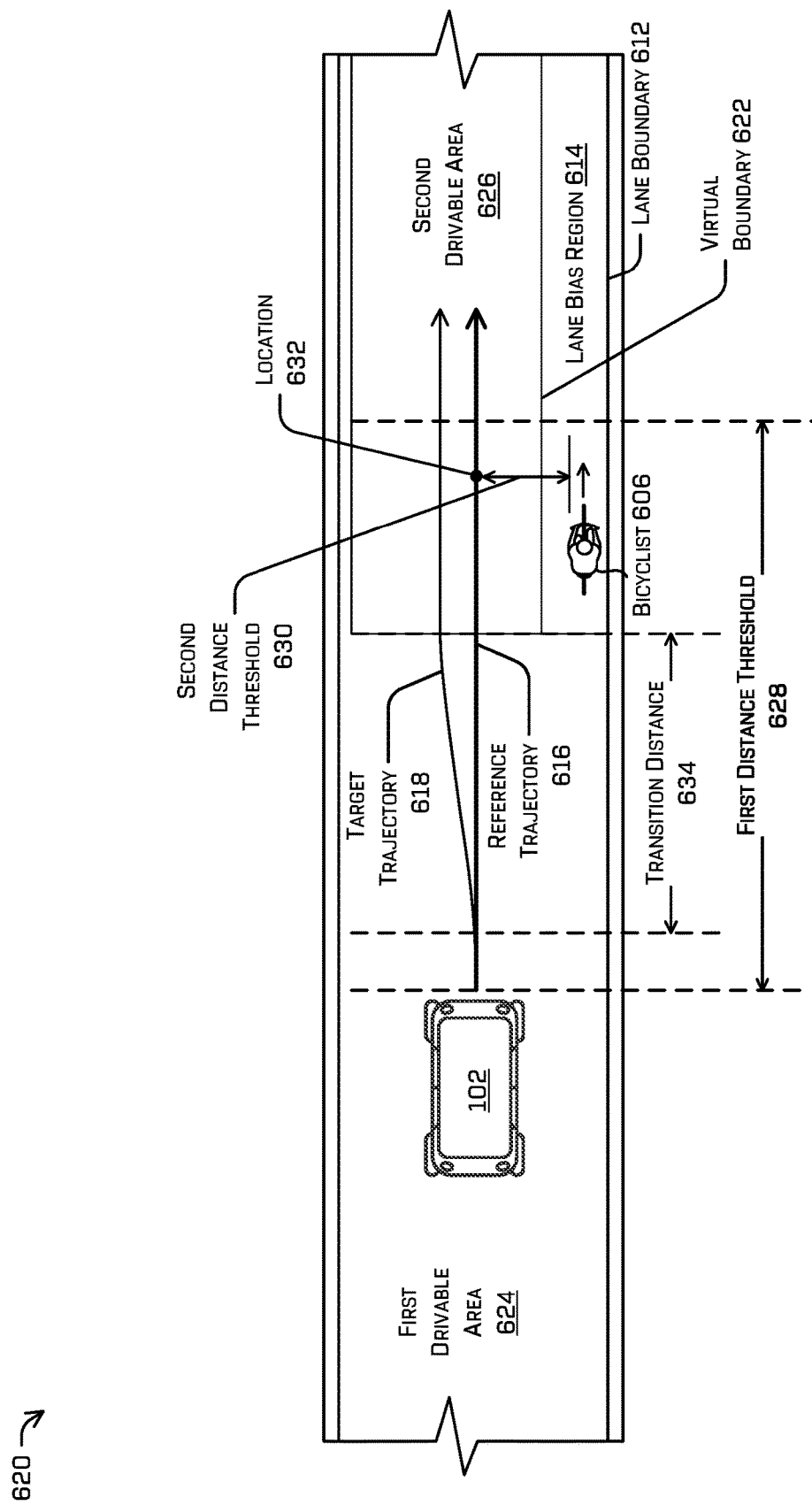
FIG. 6B is an illustration of determining a lane bias region and a target trajectory based on the lane bias region, in accordance with embodiments of the disclosure.

FIG. 6B is an illustration of determining a lane bias region 614 and a target trajectory 618 based on the lane bias region 614. As discussed above, the vehicle 102 can determine a first drivable area 624 associated with a first width which can be similar to the drivable area 610 depicted in FIG. 6A. Additionally, the vehicle computing device(s) 112 can determine a predicted trajectory for the bicyclist 606 and, as an example and as depicted in FIG. 6B, determine that the vehicle 102 may pass the bicyclist 606. Although depicted as a bicyclist, the bicyclist 606 can be any object such as a pedestrian, another vehicle, and the like. Upon satisfaction of at least one of the conditions discussed herein, the vehicle computing device(s) 112 can determine a lane bias region 614 which can provide a region for the bicyclist 606 to traverse. To determine the lane bias region 614, the vehicle computing device(s) 112 can expand a size, or move a location, of the lane boundary 612 of the first drivable area 624 to virtual boundary 622. Based at least in part on the virtual boundary 622, a second drivable area 626 associated with a second width can be determined. The lane bias region 614 can be based on a difference between the first width and the second width which can represent the lane bias region 614.

As the vehicle 102 traverses the environment 620, the sensor system(s) 108 can generate sensor data 110 and the vehicle computing device(s) 112 can use the sensor data 110 to detect an object (e.g., bicyclist 606) in the environment 620. In some examples, the vehicle computing device(s) 112 can use the sensor data 110 to determine an object type (e.g., a vehicle, a pedestrian, a bicyclist, an animal, a static object, a dynamic object, and the like) associated with the object. For example, the vehicle computing devices(s) 112 can perform object detection, segmentation, and/or classification based at least in part on the sensor data 110 to determine the object type. In some examples, the vehicle computing device(s) 112 may comprise one or more machine learning algorithms trained to detect, segment, and/or classify sensor data in association with an object.

In some instances, the vehicle computing device(s) 112 can use the object type to determine a distance threshold (e.g., a first distance threshold 628) indicating a distance between the vehicle 102 and the object. The vehicle computing device(s) 112 can determine that at least a portion of the object is within the distance threshold and based on determining that at least a portion of the object is within the distance threshold, determine the lane bias region 614, which as discussed above, can include determining a second drivable area 626 that is associated with a width that is less than the width associated with the first drivable area 624.

In some instances, the distance can be the first distance threshold 628 and can indicate an upper and/or lower longitudinal, lateral, and/or Euclidean distance between the vehicle 102 and object (e.g., the bicyclist 606). The first distance threshold 628 can be stored in memory and/or can be determined by the vehicle computing device(s) 112 based at least in part on a velocity of the vehicle 102 and/or a velocity of the object. By way of example and without limitation, a longitudinal distance threshold associated with a pedestrian object type can be 30 meters (or any other suitable distance, e.g., 20 meters, 10 meters, etc.), indicative of the pedestrian being 30 meters ahead of the vehicle along the road. The vehicle computing device(s) 112 can then detect an object that is a pedestrian in the environment 620 and determine the object type of the object which can be associated with the distance threshold of 30 meters.

In some instances, an upper distance threshold and a lower distance threshold can be used to determine the lane bias region 614. The upper distance threshold and lower distance threshold may indicate a range of distances between the vehicle and the object for which the vehicle computing device(s) 112 may calculate a lane bias region 614. For example, if a lateral distance, or a predicted lateral distance (discussed in further detail below), between an object and the vehicle 102 meets or exceeds the upper distance threshold, then the vehicle 102 can refrain from determining the lane bias region 614. By meeting or exceeding the upper distance threshold, the vehicle computing device 112 can determine that enough of a safety region between the vehicle 102 and the object exists without the lane bias region 614. If the lateral distance, or the predicted lateral distance, is below the upper distance threshold, then the vehicle computing device 112 can determine the lane bias region 614 to, as discussed above, provide a region for the object to traverse.

In some instances, a lower distance threshold can be used to determine the lane bias region 614. For example, if a lateral distance, or a predicted lateral distance, between the object and the vehicle 102 is below the lower distance threshold, then the vehicle 102 can refrain from determining the lane bias region 614. In some such cases, being below a lower distance threshold may be indicative of the fact that there is insufficient room to perform such a lane biasing maneuver. By way of example and without limitation, a longitudinal distance between an object and the vehicle 102 can be below the first distance threshold 628. In some instances, the object can be directly in front of the vehicle 102 where the lateral distance between the object and the vehicle 102 is minimal. However, because the object is in front of the vehicle 102, determining a lane bias region 614 is not necessary. Therefore, a lower distance threshold can be used to associate the object with a lateral portion of the vehicle 102.

For example, the vehicle computing device(s) 112 can determine a lateral lower distance threshold (e.g., second distance threshold 630) of 0.4 meters (or any other suitable distance, e.g., 0.5 meters, 2 meters, etc.) that is associated with a bicyclist. As the vehicle 102 approaches the bicyclist, or vice versa, so long as the lateral distance between the vehicle 102 and the bicyclist is below the lower distance threshold, indicating that the bicyclist is substantially in front or behind the vehicle 102, the vehicle 102 can maintain a current trajectory. In such circumstances, it can be safer for the vehicle 102 to monitor the bicyclist and react if necessary as opposed to adjusting a position in a lane (as may be done by determining a lane bias region 614 that can push the vehicle 102 toward other objects in the environment 620). If the lateral distance between the vehicle 102 and the bicyclist meets or exceeds the lower distance threshold, then the vehicle can determine the lane bias region 614 to provide a region for the bicyclist to traverse.

In some instances, the distance threshold can be a time threshold based on an amount of time. For example, the vehicle computing device(s) 112 can determine, based on a speed associated with the vehicle 102 and/or a speed associated with the object, that the object is an amount of time from the vehicle 102. By way of example and without limitation, the vehicle can travel at a speed of 10 meters per second and detect that the object is traveling at a speed of 5 meters per second at a distance of 20 meters ahead of the vehicle 102. The vehicle computing device(s) 112 can determine a time threshold (which may be based on a distance between the vehicle and an object, a speed of the vehicle, a speed of the object, and/or a relative speed between the vehicle and the object), that is associated with an object type of the object, of 6 seconds (or any other suitable amount of time, e.g. 4 seconds, 8 seconds, etc.). Based on determining that the object is within the distance threshold (after 4 seconds, the vehicle 102 will have traversed 40 meters, the object will have traversed 20 meters, and the vehicle will be adjacent to the object), the vehicle computing device(s) 112 can determine the lane bias region 614.

As discussed above, the distance threshold can be based on the object type. By way of example and without limitation, the distance threshold associated with a vehicle object type can be 20 meters (or any other suitable distance, e.g., 15 meters, 10 meters, etc.) and the distance threshold associated with a static object type (e.g., a tree branch, a tipped over trash can, and the like) can be 10 meters (or any other suitable distance, e.g., 20 meters, 30 meters, etc.). In some examples, the distance threshold can be based on a direction relative to the vehicle 102. By way of example and without limitation, the distance threshold associated with a pedestrian that is ahead of the vehicle 102 can be 30 meters (or any other suitable distance, e.g., 20 meters, 10 meters, etc.) and the distance threshold associated with a pedestrian that is behind the vehicle 102 can be 0 meters (or any other suitable distance, e.g., 5 meters, 10 meters, etc.). In such examples, additional computational resources may be freed with respect to those objects behind the vehicle. Similarly, and by way of example and without limitation, the distance threshold associated with a bicyclist that is substantially lateral to the vehicle 102 can be 3 meters (or any other suitable distance, e.g., 5 meters, 10 meters, etc.). As discussed above, the vehicle computing device(s) 112 can determine that at least a portion of the object is within the distance threshold, satisfying a distance threshold condition. Upon satisfying the distance threshold condition, the vehicle computing device(s) 112 can determine the lane bias region 614.

In some examples and as discussed above, the vehicle computing device(s) 112 can determine a velocity and/or a trajectory associated with the object. In some examples, determining the velocity of the object may comprise determining a relative velocity of the object based at least in part on a velocity of the vehicle and/or a vehicle body coordinate frame or vehicle trajectory coordinate frame. and the vehicle computing device(s) 112 may use the object velocity and/or velocity associated with the vehicle 102 to determine a probability that the object will be adjacent to the vehicle 102 within a period of time. For example, the probability can be determined by predicting a location of the vehicle 102 within a period of time and predicting a location of the bicyclist within the period of time based at least in part on a velocity of the vehicle 102 and bicyclist, respectively, based on map data, based on predicted trajectories of objects, and the like.

In some examples, as discussed above, the vehicle computing device(s) 112 can, using the velocity of the vehicle 102 and the velocity of the object, determine a location 632 at which the vehicle 102 is likely to be adjacent to the object within a period of time. In some instance, the location 632 can be a relative location that is relative to the vehicle 102 and/or the object. In some instances, the location 632 can be a range of locations that are associated with the period of time. By way of example and without limitation, the vehicle computing device(s) 112 can determine a location 632 in the environment 620 at which at least a portion of the reference trajectory 616 is within a threshold distance of the object and/or a projected position associated with the object, which may be determined based at least in part on the object velocity. Determining such a location 632 may be based at least in part on a receding horizon (e.g., determining whether such a location exists within a next 5 meters, 20 meters, 50 meters, 0.5 seconds of operation, 3 seconds of operation). In some examples, determining the location 632 may additionally or alternatively comprise determining a probability that the object will be adjacent to the vehicle 102 at the location 632 within the period of time or the distance specified by the receding horizon.

In some examples, the vehicle computing device(s) 112 can determine an estimated or multiple estimated trajectories associated with the bicyclist to determine the probability or multiple probabilities of following the different estimated trajectories. For example, a trajectory can indicate a path and/or an intended path for the vehicle 102 and/or the object. In some instances, the estimated trajectory can be based on map data where a higher number of road intersections, bicycle trail intersections, and the like along a portion of the trajectory of the vehicle 102 can decrease the probability that that the bicyclist will be adjacent to the vehicle 102 within a period of time or a distance as the estimated trajectory can include a turn at an intersection and deviate from the trajectory of the vehicle 102. In such examples, the vehicle 102 may only bias against the object where there is a high likelihood that the vehicle may interact with the object thereby optimizing the safe operation of the vehicle 102 by only biasing away when necessary for additional safety of the object.

By way of another example and without limitation, the estimated trajectory can be based on the sensor data 110. The vehicle computing device(s) 112 can detect, using the sensor data 110, an obstruction in the road ahead and determine an estimated trajectory associated with the bicyclist that includes a stopping trajectory for the bicyclist to avoid a collision. In turn, this estimate may increase the probability that the bicyclist will be adjacent (e.g., within a threshold distance) to the vehicle 102. In some examples, a change in the relative velocity can increase or decrease the probability that the bicyclist will be adjacent to the vehicle 102. By way of example and without limitation, a decrease in the velocity of the bicyclist can increase the relative velocity of the vehicle 102 to the bicyclist and, in turn, increase the probability that the bicyclist will be adjacent to the vehicle 102. Similarly, an increase in the velocity of the bicyclist can decrease the relative velocity of the vehicle 102 to the bicyclist, and likewise, decrease the probability that the bicyclist will be adjacent to the vehicle. Further, in such examples where the object trajectory swerves (e.g., to avoid a pothole or other collision), any such lane biasing described herein may be with respect to a trajectory of the object (thereby ensuring sufficient space for the object despite the object's relative motion).

In some examples, the vehicle computing device(s) 112 can use a probability threshold to determine the lane bias region 614. For example, the vehicle computing device(s) 112 can determine that a probability threshold of 50% is satisfied by determining that the bicyclist has an 80% probability of being adjacent to the vehicle 102. Based at least in part on determining that the probability satisfies the probability threshold, the vehicle computing device(s) 112 may determine the lane bias region 614.

The vehicle computing device(s) 112 can determine a width of the lane bias region 614 based on the object type. By way of example and without limitation, the width of the lane bias region 614 can be 0.75 meters for a vehicle, 0.5 meters for a static object, 1 meter for a bicyclist, and 1.5 meters for a pedestrian. As discussed above, the vehicle 102 can determine a drivable area 610 that represents a region in the environment 620 where the vehicle can travel. The lane bias region 614 can represent a portion of the drivable area 610 and, in some examples, represents a virtual boundary of the drivable area 610. Therefore, by way of example and without limitation, the vehicle computing device(s) 112 can detect a bicyclist and determine that the lane bias region 614 associated with the bicyclist can have a width of 1 meter and effectively reduce a width of the drivable area 610 by 1 meter.

In some examples, the width of the lane bias region 614 can be based on the width of the drivable area 610. By way of example and without limitation, the drivable area 610 can have a drivable area width of 2.2 meters and the vehicle 102 can have a vehicle width of 2 meters. The vehicle computing device(s) 112 can detect a bicyclist and determine that the lane bias region 614 associated with the bicyclist should have a width of 1 meter. However, the available width within the drivable area 610 is 0.2 meters (the difference between the drivable area width and the vehicle width). Therefore, the vehicle computing device(s) 112 can determine that the lane bias region 614 can have a width of 0.2 meters.

The vehicle computing device(s) 112 can determine a transition area from the drivable area 610 before being reduced by, or a portion of, the lane bias region 614 and the drivable area 610 after being reduced by, or a portion of, the lane bias region 614. For example, the vehicle computing device(s) 112 can use a transition distance threshold that can indicate a transition distance 634. By way of example and without limitation, the transition threshold can indicate a transition distance of 5 meters. A drivable area 610 can have a width of 2.5 meters and the lane bias region 614 can have a width of 0.35 meters. The transition distance 634 can indicate that the drivable area 610 can transition from 2.5 meters to a reduced drivable area (also referred to as a second drivable area) of 2.15 meters within the transition distance of 5 meters.

In some instances, the transition area between the drivable area and the reduced drivable area can based on a linear transition, an exponential transition, or a logarithmic transition, although other suitable calculations (and resulting shaped areas) are contemplated. For example, a linear transition can result in a transition area that reduces linearly with respect to the transition distance 634 and an exponential transition can result in a transition area that reduces exponentially with respect to the transition distance 634. Of course, though described as a distinct area, such a transition area may be the area in which the vehicle transitions from the first reference line (of the lane) to the biased position in the lane (e.g., which may be determined based on costs for each component and may result in such linear, exponential, etc. reductions). In some instances, the transition distance 634 can be based on the relative velocity between the vehicle 102 and the object. For example, a higher relative velocity can be associated with a longer transition distance 634 and a lower relative velocity can be associated with a shorter transition distance 634. Additionally or alternatively, a transition time can be used to determine the transition from the drivable area 610 to the reduced drivable area. By way of example and without limitation, a time threshold associated with the transition distance 634 can be 10 seconds and can indicate that the vehicle 102 can transition (via a transition area) from using the drivable area to using the reduced drivable area within 10 seconds.

The techniques described herein to generate the lane bias region 614 can improve a functioning of a computing device by reducing an amount of computational resources required to determine the lane bias region. For example, the distance threshold can allow the vehicle computing device(s) 112 to determine lane bias regions associated with objects that are within a vicinity of the vehicle 102, while preserving computational resources when no objects are present. Additionally, determining a probability of the object being adjacent to the vehicle 102 and determining lane bias regions based on the probability can also reduce the amount of computational resources required to determine the lane bias region, as above. The distance threshold and the probability threshold can prevent and/or limit the amount of lane bias regions associated with objects of environment 620 that the vehicle computing device(s) determines which can reduce the amount of processing power and memory consumed by the vehicle computing device(s) 112. These and other improvements to the functioning of the computer are discussed herein.

As discussed above, in the case where the vehicle is an autonomous vehicle, a computing device can determine the lane bias region which can result in providing additional space for an object to traverse the environment. By determining the lane bias region, the vehicle can determine a target trajectory that reduces a probability of a negative safety outcome (e.g., a collision) with the object and provide a more comfortable ride for a passenger of the vehicle. Thus, using the lane bias region, the trajectory can be a safer and/or a more comfortable trajectory than a target trajectory that does not use the lane bias region.

Figure 7:
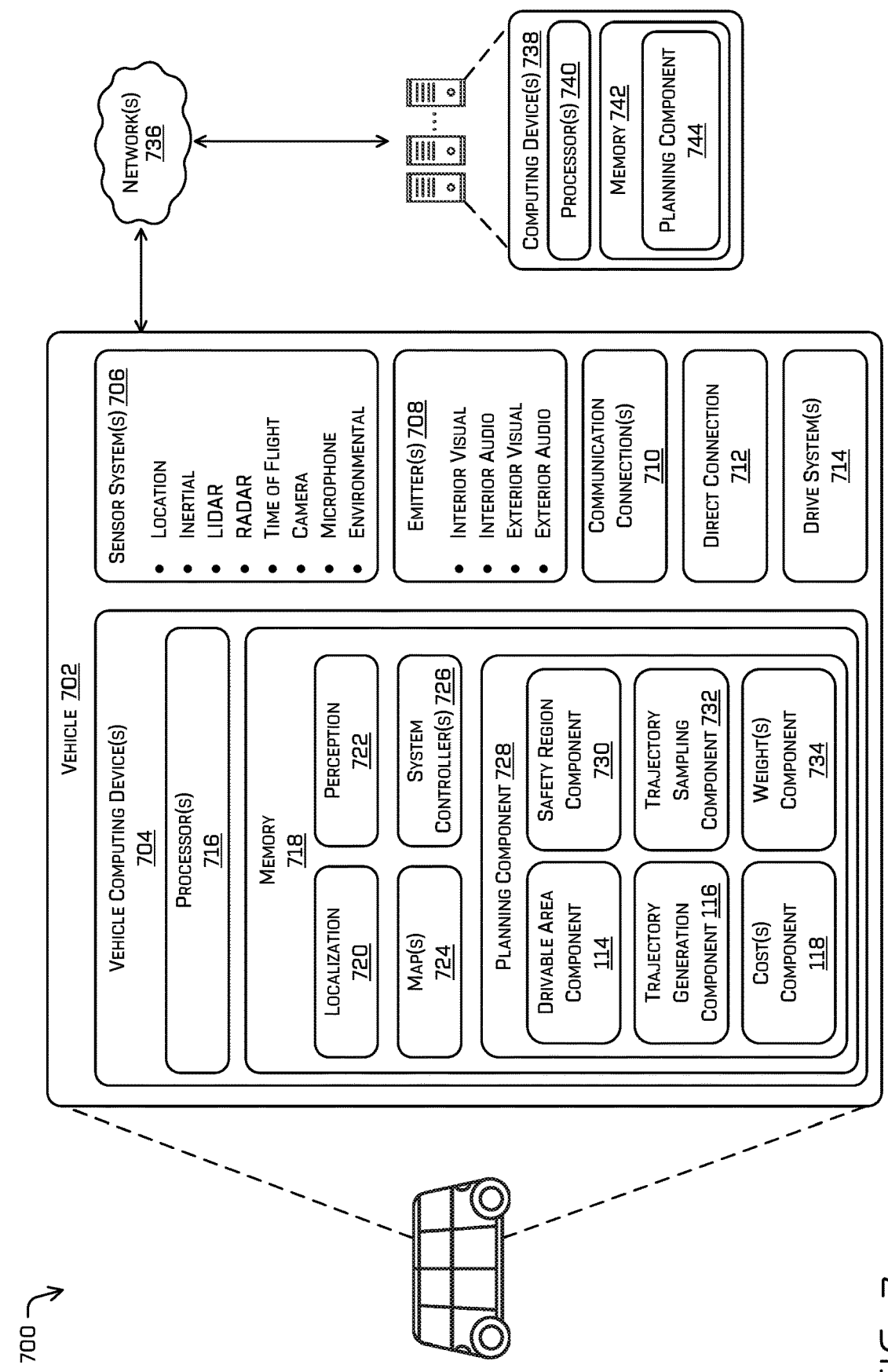
FIG. 7 depicts a block diagram of an example system for implementing the techniques described herein.

FIG. 7 depicts a block diagram of an example system 700 for implementing the techniques described herein. In at least one example, the system 700 can include a vehicle 702.

The vehicle 702 can include vehicle computing device(s) 704, one or more sensor systems 706, one or more emitters 708, one or more communication connections 710, at least one direct connection 712, and one or more drive systems 714.

The vehicle computing device(s) 704 can include one or more processors 716 and memory 718 communicatively coupled with the one or more processors 716. In the illustrated example, the vehicle 702 is an autonomous vehicle; however, the vehicle 702 could be any other type of vehicle.

In the illustrated example, the memory 718 of the vehicle computing device(s) 704 stores a localization component 720, a perception component 722, one or more maps 724, one or more system controllers 726, and a planning component 728 comprising the drivable area component 114, the trajectory generation component 116, the cost(s) component 118, a safety region component 730, a trajectory sampling component 732, and a weight(s) component 734. Though depicted in FIG. 7 as residing in memory 718 for illustrative purposes, it is contemplated that the localization component 720, the perception component 722, the one or more maps 724, the one or more system controllers 726, the planning component 728, the drivable area component 114, the trajectory generation component 116, the cost(s) component 118, the safety region component 730, the trajectory sampling component 732, and the weight(s) component 734 may additionally, or alternatively, be accessible to the vehicle 702 (e.g., stored remotely).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, RADAR data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for generating map data, as discussed herein.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 718 can further include one or more maps 724 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 724 can include at least one map (e.g., images and/or a mesh). In some examples, the vehicle 702 can be controlled based at least in part on the maps 724. That is, the maps 724 can be used in connection with the localization component 720, the perception component 722, and/or the planning component 728 to determine a location of the vehicle 702, identify objects in an environment, and/or generate routes and/or trajectories to navigate within an environment.

In some examples, the one or more maps 724 can be stored on a remote computing device(s) (such as the computing device(s) 738) accessible via network(s) 736. In some examples, multiple maps 724 can be stored based on, for example, a characteristic (e.g., type of entity, time of day, day of week, season of the year, etc.). Storing multiple maps 724 can have similar memory requirements, but increase the speed at which data in a map can be accessed.

In at least one example, the vehicle computing device(s) 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

In general, the planning component 728 can determine a path for the vehicle 702 to follow to traverse through an environment. For example, the planning component 728 can determine various routes and trajectories and various levels of detail. For example, the planning component 728 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, distributed points along a line connecting the first location to the second location constrained by a map and/or map information, etc. Further, the planning component 728 can generate an instruction for guiding the autonomous vehicle along at least a portion of the route from the first location to the second location. In at least one example, the planning component 728 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In some instances, the planning component 728 can include a prediction component to generate predicted trajectories of objects in an environment. For example, a prediction component can generate one or more predicted trajectories for vehicles, pedestrians, animals, and the like within a threshold distance from the vehicle 702. In some instances, a prediction component can measure a trace of an object and generate a trajectory for the object based on observed and predicted behavior. Examples of generating predicted trajectories are discussed in U.S. patent application Ser. No. 16/151,607, filed Oct. 4, 2018 and Ser. No. 15/982,658, filed May 17, 2018. Application Ser. Nos. 16/151,607 and 15/982,658 are herein incorporated by reference, in their entirety.

In some instances, the drivable area component 114 can include functionality to generate and/or determine a drivable area in an environment. For example, the drivable area component 114 can receive sensor data from the sensor system(s) 706 and/or can receive information about obstacles and/or objects in the environment from the perception component 722. Based at least in part on the sensor data and/or on information associated with the objects (e.g., location, pose, extent, classification, velocity, predicted trajectories, etc.) the drivable area component 114 can determine a drivable area comprising one or more regions, including but not limited to a dilated region, a collision region, and a safety region, as discussed herein. In some instances, the drivable area component 114 can determine an extent of the region(s) based on a classification type associated with objects proximate to the region(s) and/or based on a velocity of the vehicle 702. Additional details of the drivable area component 114 are discussed throughout this disclosure.

In some instances, the trajectory generation component 116 can include functionality to generate a reference trajectory and/or a target trajectory within the drivable area. For example, the trajectory generation component 116 can receive or determine a reference trajectory, which can correspond to a centerline of a road segment or other path through an environment. In some instances, the trajectory generation component 116 can generate segments that can correspond to a motion primitive generated in accordance with the techniques discussed in U.S. patent application Ser. No. 15/843,596, filed Dec. 15, 2017. Further, a segment defined by a desired curvature can be generated in accordance with the techniques discussed in U.S. patent application Ser. No. 15/843,512, filed Dec. 15, 2017. Application Ser. Nos. 15/843,596 and 15/843,512 are herein incorporated by reference, in their entirety. Additional details of the trajectory generation component 116 are discussed throughout this disclosure.

In some instances, the cost(s) component 118 can include functionality to evaluate one or more costs to generate a target trajectory with respect to the reference trajectory. As discussed above, the one or more costs may include, but is not limited to, a reference cost, an obstacle cost, a lateral cost, and longitudinal cost, and the like. In some examples, one or more costs can be evaluated in accordance with the techniques discussed in U.S. patent application Ser. No. 16/147,492, filed Sep. 28, 2018, which is hereby incorporated by reference, in its entirety. Additional details of the cost(s) component 118 are discussed throughout this disclosure.

In some instances, the safety region component 730 can include functionality to generate an updated safety region based at least in part on a classification of objects in an environment and/or on a velocity of the vehicle 702 traversing the environment. As illustrated in FIGS. 5A, 5B, and 6, the safety region component 730 can determine a size of a safety region (or other region), which can be used by the cost(s) component 118 in generating a target trajectory. Additional details of the safety region component 730 are discussed throughout this disclosure.

In some instances, the trajectory sampling component 732 can include functionality to determine a point density for portions of the reference trajectory based at least in part on a cost associated with a curvature value associated with a portion of the reference trajectory and/or based at least in part on a cost associated with a distance between a point on the reference trajectory and a point associated with an obstacle in the environment. As illustrated in FIG. 2, the trajectory sampling component 732 can determine a density of points for a reference trajectory when a cost associated with a curvature value is relatively high and/or when cost associated with a distance between a point on the reference trajectory and a point associated with an obstacle in the environment is relatively high (e.g., indicating that an object in the environment is located relatively close to a reference trajectory). Increasing the number of points around a region of high activity or a region of interest allows for cost(s) to be evaluated at more points, thereby ensuring a safe and comfortable ride for the vehicle 702. Additional details of the trajectory sampling component 732 are discussed throughout this disclosure.

In some instances, the weight(s) component 734 can include functionality to select or determine weight(s) associated with evaluating one or more cost functions when generating a target trajectory. For example, and as illustrated in FIGS. 3 and 4, an action start (such as the start of a double-parked vehicle action or a lane change action) can vary a weight of a cost in order to allow the planning component 728 generate a target trajectory with more flexibility for the vehicle 702 to traverse the environment. Further, weight(s) can be adjusted in combination with other operations (e.g., when expanding a lane boundary based on a proximity of a bicyclist, bike lane, parking lane, parked car, and the like). Additional details of the weight(s) component 734 are discussed throughout this disclosure.

In some instances, aspects of some or all of the components discussed herein can include any models, algorithms, and/or machine learning algorithms. For example, in some instances, the components in the memory 718 (and the memory 742, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 706 can include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 706 can include multiple instances of each of these or other types of sensors. For instance, the LIDAR sensors can include individual LIDAR sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device(s) 704. Additionally or alternatively, the sensor system(s) 706 can send sensor data, via the one or more networks 736, to the one or more computing device(s) 738 at a particular frequency, after a lapse of a predetermined period of time, in near real-time, etc.

The vehicle 702 can also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device(s) 704 to another computing device or a network, such as network(s) 736. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, RADAR sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In some examples, the vehicle 702 can send sensor data to one or more computing device(s) 738 via the network(s) 736. In some examples, the vehicle 702 can send raw sensor data to the computing device(s) 738. In other examples, the vehicle 702 can send processed sensor data and/or representations of sensor data to the computing device(s) 738. In some examples, the vehicle 702 can send sensor data to the computing device(s) 738 at a particular frequency, after a lapse of a predetermined period of time, in near real-time, etc. In some cases, the vehicle 702 can send sensor data (raw or processed) to the computing device(s) 738 as one or more log files.

The computing device(s) 738 can include processor(s) 740 and a memory 742 storing a planning component 744.

In some instances, the planning component 744 can substantially correspond to the planning component 728 and can include functionality to generate trajectories for the vehicle 702 in an environment.

The processor(s) 716 of the vehicle 702 and the processor(s) 740 of the computing device(s) 738 can be any suitable processor capable of executing instructions to process data and perform operations as described herein. By way of example and not limitation, the processor(s) 716 and 740 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 742 are examples of non-transitory computer-readable media. The memory 718 and 742 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 718 and 742 can include at least a working memory and a storage memory. For example, the working memory may be a high-speed memory of limited capacity (e.g., cache memory) that is used for storing data to be operated on by the processor(s) 716 and 740. In some instances, the memory 718 and 742 can include a storage memory that may be a lower-speed memory of relatively large capacity that is used for long-term storage of data. In some cases, the processor(s) 716 and 740 cannot operate directly on data that is stored in the storage memory, and data may need to be loaded into a working memory for performing operations based on the data, as discussed herein.

It should be noted that while FIG. 7 is illustrated as a distributed system, in alternative examples, components of the vehicle 702 can be associated with the computing device(s) 738 and/or components of the computing device(s) 738 can be associated with the vehicle 702. That is, the vehicle 702 can perform one or more of the functions associated with the computing device(s) 738, and vice versa.

Figure 8:
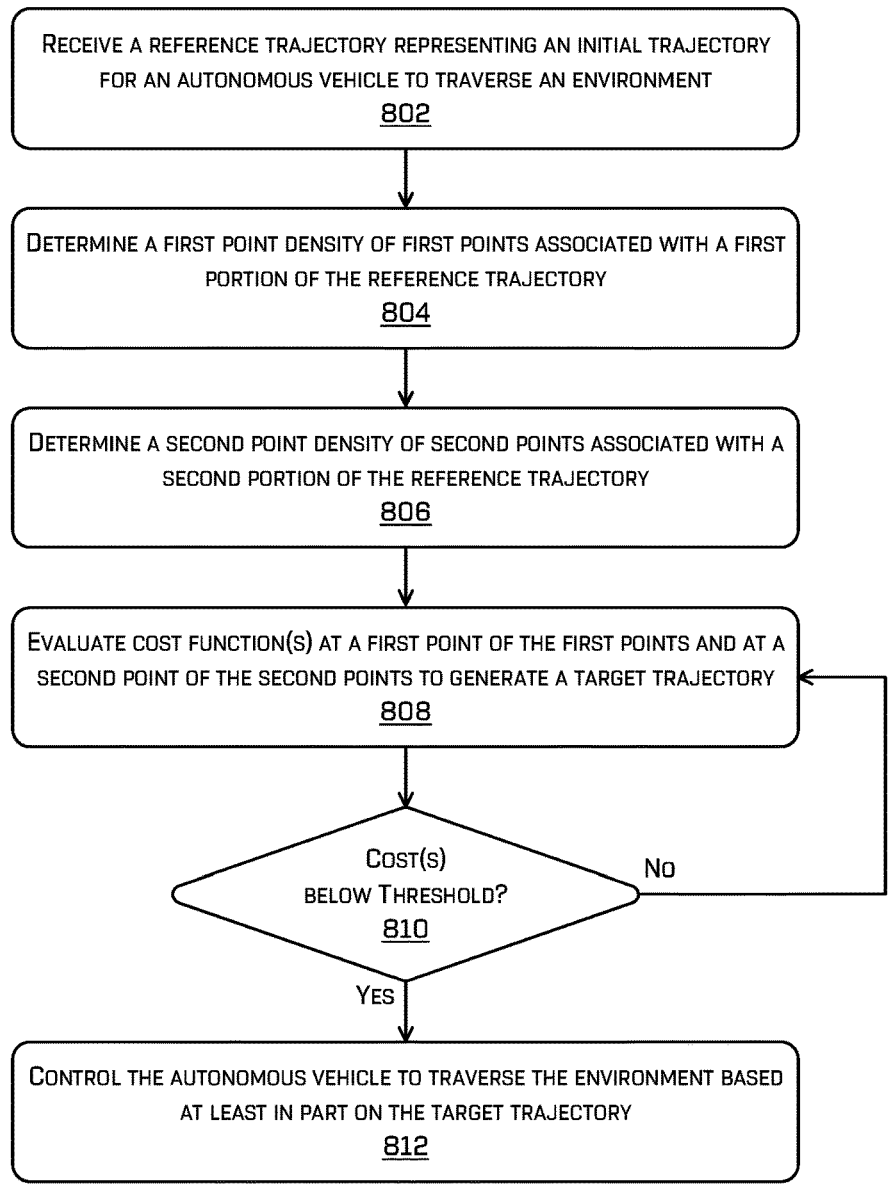
FIG. 8 depicts an example process for determining a point density for points associated with a reference trajectory and evaluating costs at the points to generate a target trajectory, in accordance with embodiments of the disclosure.
Figure 9:
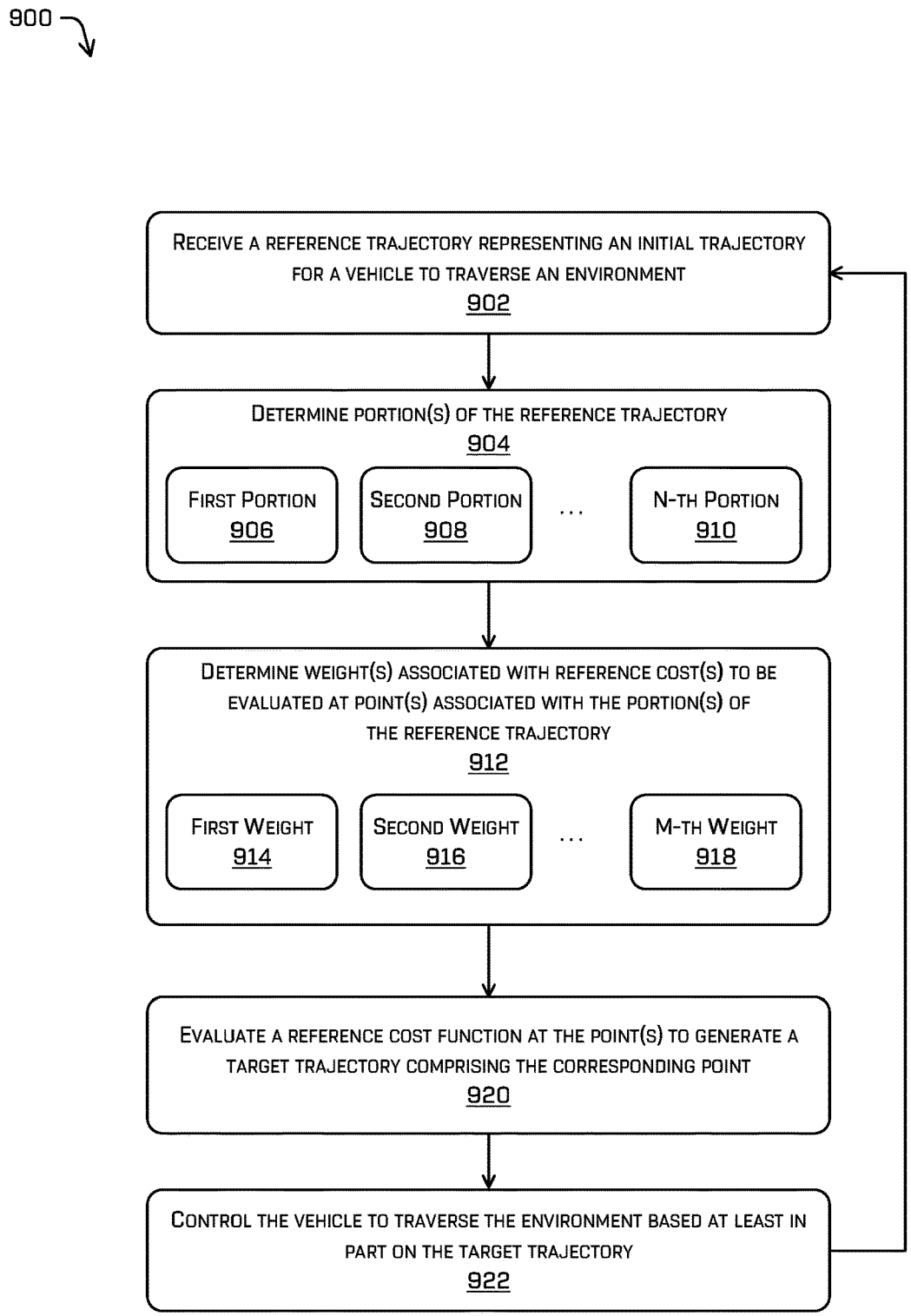
FIG. 9 depicts an example process for determining weights for points associated with a reference trajectory and evaluating, based on the weights, costs at the points to determine a target trajectory, in accordance with embodiments of the disclosure.

FIGS. 8 and 9 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 8 depicts an example process 800 for determining a point density for points associated with a reference trajectory and evaluating costs at the points to generate a target trajectory, in accordance with embodiments of the disclosure. For example, some or all of the process 800 can be performed by one or more components in FIG. 1 or 7, as described herein. For example, some or all of the process 800 can be performed by the vehicle computing device(s) 112 and/or the computing device(s) 704.

At operation 802, the process can include receiving a reference trajectory representing an initial trajectory for an autonomous vehicle to traverse an environment. In some instances, the reference trajectory can comprise a segment of a continuous trajectory or a piecewise trajectory, depending on an action to be performed and a path to be followed in an environment. In some examples, a reference trajectory can be based at least in part on static and/or dynamic obstacles in an environment, a minimum or maximum longitudinal acceleration or velocity, a maximum steering angle, vehicle dynamics (e.g., a notion that the wheels do not slip, etc.).

At operation 804, the process can include determining a first point density of first points associated with a first portion of the reference trajectory. For example, the operation 804 can include determining a cost associated with a curvature value associated with a portion of the reference trajectory and/or a cost associated with a distance to a point associated with an obstacle that is below a threshold value. In some examples, the operation 804 can include accessing a lookup table to determine a point density based on the cost and/or to access a function to determine a point density. For example, a first cost below a first threshold (e.g., 0.1 or x) a first point density can be selected as the point density for a region. Further, where a second cost is above the first threshold (e.g., 0.1 or y) but below a second threshold (e.g., 0.5 or y), a second point density can be based on linearly interpolating between density values. Further, where a third cost is above the second threshold (e.g., 0.5 or y), a third point density can be selected as the point density for a region. Of course, costs can be selected in a variety of manners.

Further, in some examples, costs associated with a curvature and/or distance can be performed by a second layer of a planner system, as discussed above. For example, the second layer can receive a first target trajectory from the first layer of the planner system, whereby the first target trajectory can include curvature values. Further, the operation 804 can include evaluating the first target trajectory over time with respect to objects in an environment to determine an initial cost associated with a distance between a point on the first target trajectory (e.g., a reference trajectory) and a point associated with an obstacle in the environment and can subsequently determine the point density based at least in part on the cost.

At operation 806, the process can include determining a second point density of second points associated with a second portion of the reference trajectory. For example, the operation 806 can include determining a region associated with a low curvature value (e.g., a curvature value below a threshold) and/or associated with a distance to a point associated with an obstacle that meets or exceeds a threshold value.

At operation 808, the process can include evaluating cost function(s) at a first point of the first points and at a second point of the second points to generate a target trajectory. For example, the operation 808 can include evaluating one or more of a reference cost, an obstacle cost, a lateral cost, a longitudinal cost, and the like.

At operation 810, the process can include determining whether cost(s) are below a threshold. For example, the operation 810 can include using technique(s) involving a gradient descent to optimize the cost function(s). In some examples, the operation 810 can include determining whether a cost is below a threshold value, determining whether a change in cost between optimization operations is below a threshold value, and/or determining whether a number of optimization iterations has been performed. If the costs meet or exceed a threshold (e.g., "no" in the operation 810) the process returns to the operation 808 where another trajectory can be generated (e.g., by varying locations of the points and/or controls (e.g., steering angles, acceleration, etc.)) and updated costs can be determined. If the costs are below a threshold (e.g., "yes" in the operation 810), the process can continue to operation 812.

At operation 812, the process can include controlling the autonomous vehicle to traverse the environment based at least in part on the target trajectory. In some instances, the target trajectory can be provided to a trajectory smoother component and/or the trajectory tracker component to refine the target trajectory and/or to generate control signals for the various motors and steering actuators of the autonomous vehicle.

FIG. 9 depicts an example process 900 for determining weights associated with points along a reference trajectory (e.g., those points determined in accordance with FIG. 8) and evaluating, based on the weights, costs at the points to determine a target trajectory, in accordance with embodiments of the disclosure. For example, some or all of the process 900 can be performed by one or more components in FIG. 1 or 7, as described herein. For example, some or all of the process 900 can be performed by the vehicle computing device(s) 112 and/or the computing device(s) 704.

At operation 902, the process can include receiving a reference trajectory representing an initial trajectory for an autonomous vehicle to traverse an environment. In some examples, this operation 902 can substantially correspond to the operation 802.

At operation 904, the process can include determining portion(s) of the reference trajectory. For example, the operation 904 can include determining a first portion 906, a second portion 908, and an N-th portion 910. In some examples, the portions 906, 908, and 910 can be discrete portions of (and/or points along) the reference trajectory. In some examples, the operation 904 can include determining the portions based at least in part on actions or maneuvers to be performed by the autonomous vehicle. For example, an action or maneuver may include, but is not limited to, a double-parked vehicle action or a lane change action. In some examples, the operation 904 can include determining that the autonomous vehicle is proximate to a bicyclist or another object in the environment and determining a portion of the reference trajectory based at least in part on a predicted trajectory of the bicyclist. In some examples, the operation 904 can include determining a location associated with the vehicle based on map data that may indicate weight(s) or a trigger to vary weights, as discussed herein.

At operation 912, the process can include determining weight(s) associated with reference cost(s) to be evaluated at point(s) associated with the portion(s) of the reference trajectory. In some cases, a reference cost is associated with a difference between a point on the reference trajectory and a corresponding point. For example, the operation 912 can include determining a first weight 914, a second weight 916, and an M-th weight 918. In some examples, the operation 912 can include determining a weight that corresponds to individual portions as determined in the operation 904. In some examples, the operation 912 can include determining a weight that corresponds to individual points (e.g., reference points) associated with individual portions. That is, if the portion 906 comprises 10 points, the operation 912 can include determining a unique weight for cost(s) associated with each of the 10 points. Of course, other configurations are contemplated herein.

At operation 920, the process can include evaluating a reference cost function at the point(s) to generate a target trajectory comprising the corresponding point. In some examples, the operation 920 can include scaling a cost by a weight as determined in the operation 912. For example, the operation 920 can include scaling a cost up or down based on the weight associated with the cost, which, in turn, can lead to changes in the contour of the target trajectory based on the weights associated with the various costs, as discussed herein. In some instances, the operation 920 can include evaluating other cost functions, and is not limited to evaluating a reference costs function. Thus, the operations provide a flexible framework to generate trajectories At operation 922, the process can include controlling the autonomous vehicle to traverse the environment based at least in part on the target trajectory. In some examples, this operation 922 can substantially correspond to the operation 812.

Figure 10:
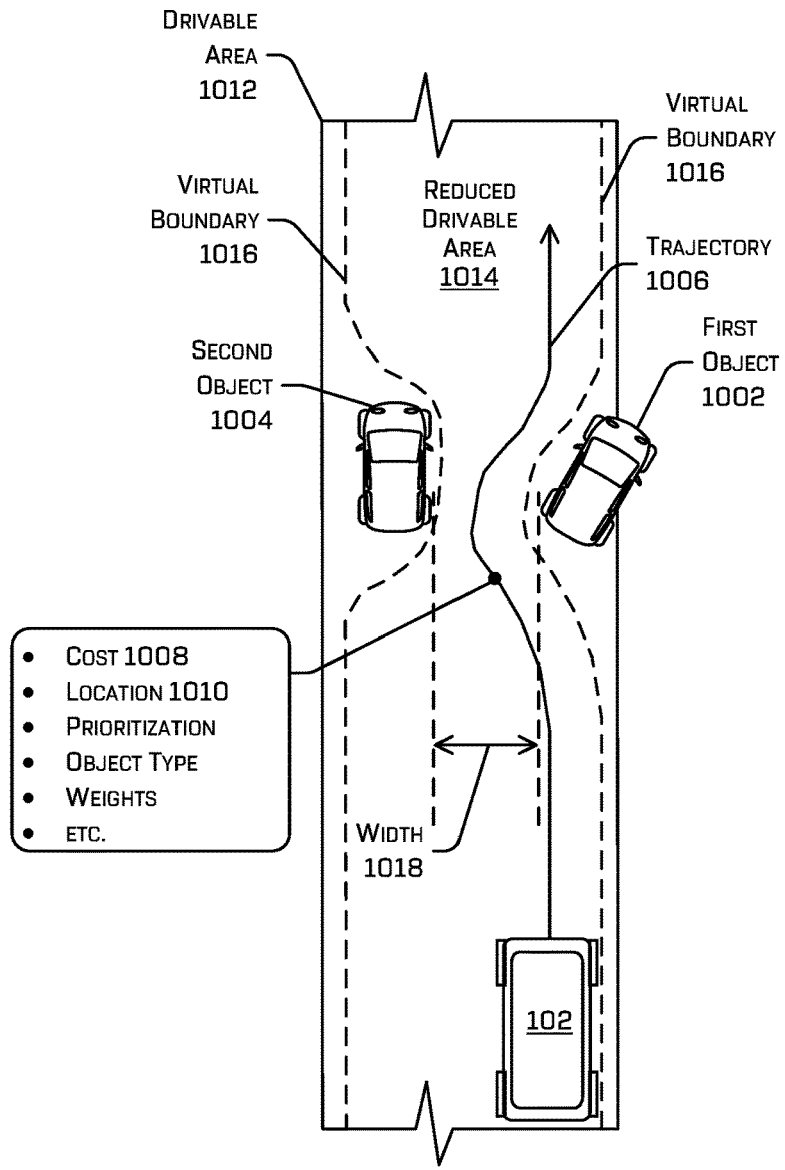
FIG. 10 is an illustration of determining a cost at a location that is associated with a portion of a trajectory, in accordance with embodiments of the disclosure.

FIG. 10 is an illustration of determining a cost at a location that is associated with a portion of a trajectory, in accordance with embodiments of the disclosure.

As illustrated in FIG. 10, the vehicle 102 can traverse an environment 1000 which can include a first object 1002 and a second object 1004. The first object 1002 and the second object 1004 can include, but are not limited to a static object (e.g., building, curb, sidewalk, lane marking, sign post, traffic light, tree, etc.) or a dynamic object (e.g., a vehicle, bicyclist, pedestrian, animal, etc.). As discussed above, the vehicle 102 can use sensor system(s) 108 to generate sensor data 110 and the vehicle computing device(s) 112 can use the sensor data 110 to detect the first object 1002 that and the second object 1004 in the environment 1000. The vehicle 102 can, based on detecting the first object 1002 and the second object 1004, determine a trajectory 1006 to traverse the environment 1000.

In some instances, the vehicle computing device(s) 112 associated with the vehicle 102 can determine a cost associated with a portion of the trajectory 1006. As discussed above, a cost can include, but is not limited to a reference cost, an obstacle cost, a collision cost, a lateral cost, a longitudinal cost, and the like. For example, a cost 1008 can be based on a location 1010 associated with a portion of the trajectory 1006 and a portion of an object (e.g., first object 1002) in the environment 1000 including other parameters such as a prioritization, an object type of the first object 1002, a weight, etc.

In some instances, the vehicle computing device(s) 112 can determine a drivable area 1012 and a position of the first object 1002 and/or the second object 1004 to determine a reduced drivable area 1014 where a portion of the drivable area 1012 that excludes the reduced drivable area 1014 can represent, for example, a collision region. As discussed above, the reduced drivable area 1014 can represent a smaller drivable area than the drivable area 1012 where the reduced drivable area 1014 can represent an area for the vehicle 102 to avoid to further reduce a likelihood that the vehicle 102 will collide with an object in the environment 1000. In some examples, a cost associated with entering the collision region can be relatively high (relative to the traversing in the reduced drivable area 1014). In some examples, the drivable area 1012 can represent an area clear of any objects and/or obstacles in the environment 1000. That is, the drivable area 1012 can represent portions of the environment where the vehicle 102 can drive. The reduced drivable area 1014 can represent a portion of the drivable area encoded with information about objects in the environment 1000 and used for various costs. In some examples, the reduced drivable area 1014 can represent offsets from objects in the environment 1000 (where the offsets can be dynamically determined) for the purpose of determining a cost associated with a collision (e.g., a collision cost).

A portion of the object can correspond to a point on a boundary such as a boundary of a drivable area 1012 or a virtual boundary 1016. As discussed above, a virtual boundary can be determined based on information about the objects in the environment 1000, which can include information about semantic classifications and/or probabilistic models. In at least some examples, the virtual boundary 1016 can be encoded with information (such as lateral distance to the nearest object, semantic classification of the nearest object, related probabilities of such distance and classification, etc.). In some instances, the virtual boundary 1016 can represent a boundary of the reduced drivable area 1014 and/or a collision region.

The vehicle computing device(s) 112 can determine a width 1018 associated with a portion of the drivable area 1012. The width 1018 can represent a width available to the vehicle 102 to traverse through the available drivable area 1012 that can be associated with a distance between a virtual boundary 1016 and/or a distance between objects in the environment 1000. In some instances, the vehicle computing device(s) 112 can compare the width 1018 to a width of the vehicle 102. Based on the comparison, the vehicle computing device(s) 112 can determine a cost associated with a portion of the trajectory 1006 that is substantially in between the first object 1002 and the second object 1004 or a virtual boundary 1016.

By way of example and without limitation, the vehicle computing device(s) 112 can determine a higher cost when a width of the vehicle exceeds the width 1018 (e.g., a blockage) and can determine a lower cost when the width of the vehicle is less than the width 1018. As discussed above, in some instances, the vehicle computing device(s) 112 can determine a location 1010 and a cost associated with a portion of the trajectory 1006. The vehicle computing device(s) 112 can determine a higher cost when the cost 1008 between the location 1010 and a portion of an object (e.g., first object 1002) is less than a portion of a width of the vehicle 102 and determine a lower cost when the cost 1008 exceeds a portion of the width of the vehicle 102. In some instances, the vehicle computing device(s) 112 can determine a higher cost when the width of the vehicle is less than the width 1018 but the vehicle 102 cannot capably traverse to the location 1010 based on a pose of the vehicle 102 without interfering with an object in the environment (e.g., a "collision), as discussed in further detail below.

By way of example and without limitation, the location 1010 can be associated with a portion of the trajectory 1006 and the vehicle 102 can traverse the environment 1000 and the vehicle computing device(s) 112 can predict that as the vehicle 102 approaches the location 1010, that the location 1010 will be substantially in a middle portion of the vehicle 102 relative to a lateral dimension of the vehicle 102. Then the vehicle computing device(s) 112 can compare half of the width of the vehicle 102 (or any other suitable width, e.g., one third of the width of the vehicle, two thirds of the width of the vehicle, half of the width of the vehicle including a fixed offset, etc.) with the cost 1008 to determine the cost associated with the location 1010.

The vehicle computing device(s) 112 can compare the cost with a cost threshold to determine a vehicle action (also referred to as maneuvers or vehicle maneuvers). For example, the cost can exceed a cost threshold and the vehicle computing device(s) 112 can determine a stop action associated with the location 1010, although any suitable vehicle actions are contemplated, e.g., a follow action, a slow action, etc. Examples of vehicle actions (or maneuvers) can be found, for example, in U.S. patent application Ser. No. 16/232,863, filed Dec. 26, 2018 and U.S. patent application Ser. No. 16/181,164, filed Nov. 5, 2018, which are hereby incorporated by reference, in their entirety.

Based on the vehicle action, the vehicle 102 can follow the trajectory 1006 and perform the vehicle action as the vehicle 102 approaches and/or arrives at the location 1010. For example, the vehicle 102 can perform a stop action at or near the location 1010 to prevent a collision with the first object 1002 and/or the second object 1004. In some instances, the vehicle computing device(s) 112 can determine the stop action at the location 1010 to stop the vehicle 102 within a threshold distance to the first object 1002 and/or the second object 1004. In some instances, the stop action can be associated with a probability of preventing a collision with the first object 1002 and/or the second object 1004. In some instances, the vehicle 102 can determine an object trajectory associated with the first object 1002 and/or the second object 1004 and perform a follow action at or near the location 1010 and wait at the location 1010 and follow, for example, the second object 1004 as the second object 1004 changes a position of the second object 1004 in accordance with the object trajectory.

As discussed above, the first object 1002 and/or the second object 1004 can change a position of the first object 1002 and/or the second object 1004. In some instances, the first object 1002 and/or the second object 1004 can change the position at a time prior to the vehicle 102 approaching the location 1010. The vehicle computing device(s) 112 can detect the change in position and, in some instances, refrain from performing the action at the location 1010 and/or discard the action. In such examples, the cost associated with location 1010 may be continuously computed/updated as the vehicle 102 progresses (e.g., at a given frequency, such as, but not limited to, 10 Hz, 30 Hz, 100 Hz, etc.).

By way of example and without limitation, based on the locations of the first object 1002 and the second object 1004, the vehicle computing device(s) 112 can determine a stop action associated with the location 1010 based on expected locations of the vehicle 102 and/or the objects 1002 and 1004 at a future time. Then, the second object 1004 can change its position prior to the vehicle 102 arriving at the location 1010 which can increase the width 1018 to exceed the width of the vehicle 102. Then the vehicle 102 can refrain from performing the stop action as the vehicle 102 arrives at the location 1010 and continue to traverse the environment 1000 based at least in part on the trajectory 1006. However, if the environment remains the same as or similar to the configuration giving rise to the stop action, the vehicle 102 can implement a stopping action to stop in accordance with the stop action as the vehicle 102 approaches the stop action. In at least some examples, such actions may further comprise reducing a velocity in anticipation of the location 1010 to provide additional time for the situation to be resolved before coming to a full stop (e.g., either other object may move, thereby providing sufficient space for the vehicle 102 to traverse obviating the need for a full stop).

In some instances, the vehicle computing device(s) 112 can determine the location 1010 can be based on a capability of the vehicle 102. For example, the vehicle computing device(s) 112 can determine capability data associated with the vehicle 102 which can indicate capabilities such as an acceleration capability, a turning radius capability, and the like. The vehicle computing device(s) 112 can, using a reference trajectory and the capability data, determine the trajectory 1006 which can indicate where the vehicle 102 can capably traverse. In some examples, various sampled points along the trajectory may be selected for performing such determinations. As non-limiting examples, such determinations may be made for every 1 m along a trajectory, at periodic locations where a width of the drivable surface is less than a threshold width, and the like.

By way of example and without limitation, the vehicle computing device(s) 112 can receive a reference trajectory which can represent an initial path or trajectory for the vehicle 102 to follow in the environment 1000 (which, in some instances, may comprise the center of a lane or, otherwise, a preferred trajectory for the vehicle 102 to follow). In some instances, the reference trajectory can exclude the capability data and indicate a desired trajectory for the vehicle 102 to follow. The vehicle computing device(s) 112 can determine capability data which can be based on, for example, a current state of the vehicle 102. The current state can indicate a velocity of the vehicle 102, a pose of the vehicle 102, and/or other state data associated with the vehicle 102.

As discussed above, the capability data can indicate an acceleration capability, a turning radius capability, and the like. By way of example and without limitation, the vehicle computing device(s) 112 can determine that the vehicle 102 is traveling at a velocity of 15 meters per second and determine a stopping distance, based at least in part on the velocity, of 10 meters. Similarly, the vehicle computing device(s) 112 can determine a pose of the vehicle 102 and determine, based at least in part on the turning radius capability of the capability data, a portion of the environment 1000 that the vehicle 102 can capably traverse toward.

Therefore, as discussed above, the vehicle computing device(s) 112 can, using the capability data, determine the location 1010 which can be associated with a portion of the environment 1000 that the vehicle 102 can capably traverse. In some instances, the vehicle computing device(s) 112 can determine the trajectory 1006, the location 1010, and/or the vehicle action on a continuous basis and/or on a periodic basis. For example, the vehicle computing device(s) 112 can determine the trajectory 1006, the location 1010, and/or the vehicle action every 0.1 seconds, although any suitable time increment is contemplated (e.g., 0.5 seconds, 1 second, etc.). In some instances, the cost 1008 can be based at least in part on the capability data. By way of example and without limitation, the portions of the environment 1000 and/or the trajectory 1006 that the vehicle 102 can capably traverse can be associated with a lower cost than the portions of the environment 1000 and/or the trajectory 1006 that the vehicle cannot capably traverse.

Figure 11A:
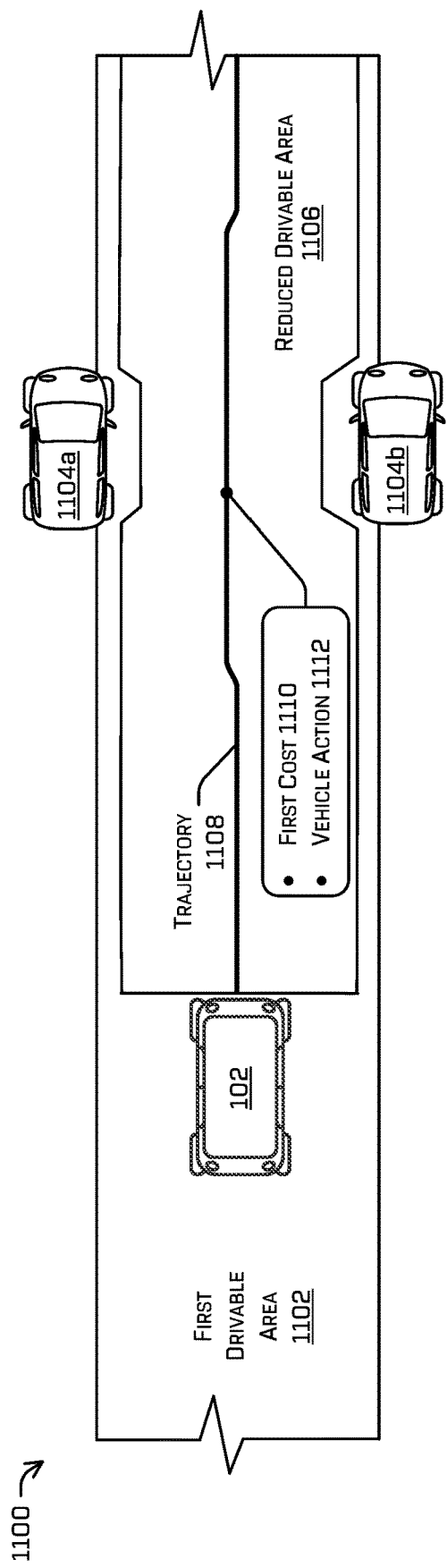
FIGS. 11A-C are additional illustrations of determining one or more costs associated and actions with one or more portions of a trajectory, in accordance with embodiments of the disclosure.

FIG. 11A is another illustration 1100 of determining cost(s) associated with a portion of a trajectory and/or an action based on such cost(s), in accordance with embodiments of the disclosure. As discussed above, the vehicle 102 can determine a first drivable area 1102 and detect object 1104a and object 1104b in the environment. Although depicted as a vehicle, the object 1104a and object 1104b can be any object such as a pedestrian, a bicyclist, and the like. By way of example and without limitation, the object 1104a and object 1104b can be static objects (e.g., a parked vehicles). The vehicle computing device(s) 112 can determine, based on detecting the object 1104a and object 1104b, a reduced drivable area 1106 which can include a virtual boundary that distinguishes the reduced drivable area 1106 from a collision region.

Based at least in part on the reduced drivable area 1104 and/or the collision region, the vehicle computing device(s) 112 can determine a trajectory 1108 to traverse the environment. Additionally, based at least in part on the reduced drivable area 1104 and/or the trajectory 1108, the vehicle computing device(s) 112 can determine a first cost 1110. In some instances, the reduced drivable area 1106 and/or the first cost 1110 can be based on a type of the object 1104a and/or object 1104b. In some instances, the first cost 1110 can additionally be based on a distance between the vehicle 102 and the object 1104a and/or object 1104b. By way of example and without limitation, the first cost 1110 can be a higher cost when associated with a pedestrian as compared to when the first cost 1110 is associated with debris or another vehicle. Based at least in part on the first cost 1110 meeting or exceeding a cost threshold, the vehicle computing device(s) 112 can determine a stop vehicle action (e.g., vehicle action 1112) associated with the portion of the trajectory that is associated with the first cost 1110. In some instances, the vehicle action can represent a "subgoal" whereby the vehicle 102 can traverse along the trajectory 1108 until it reaches a location associated with the subgoal. In some instances, the environment may update to remove the subgoal (e.g., an object may move or a trajectory may be updated) or the subgoal may remain and the vehicle 102 can be controlled or otherwise perform the subgoal (e.g., stopping or following).

Figure 11B:
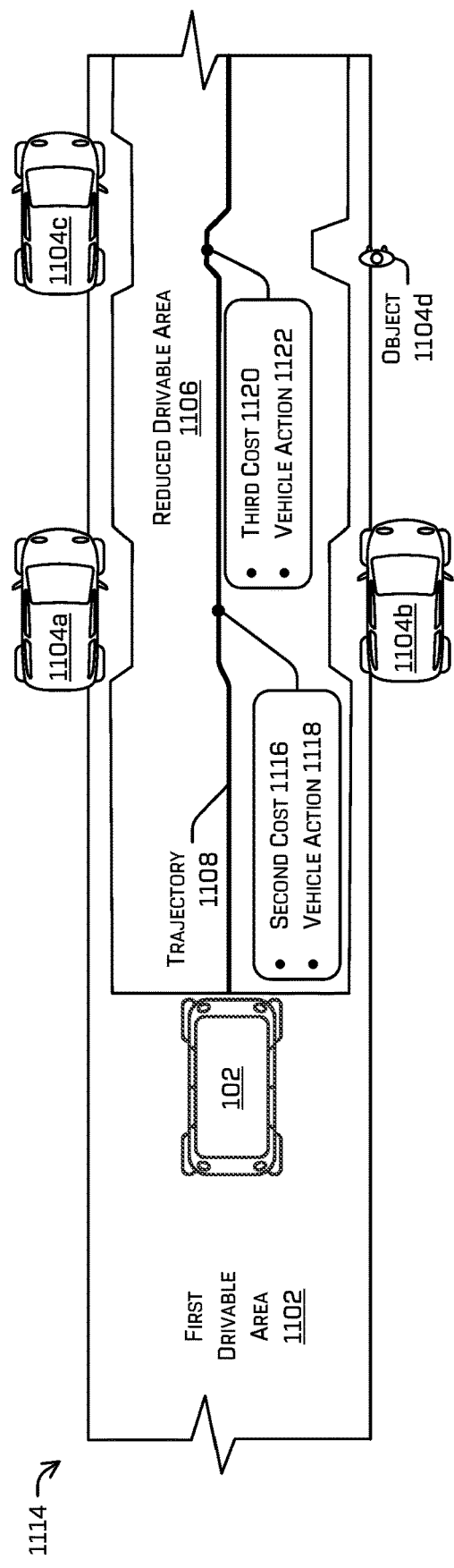

FIG. 11B is another illustration 1114 of determining a cost associated with a portion of a trajectory, in accordance with embodiments of the disclosure. As discussed above and similar to FIG. 11A, the vehicle computing device(s) 112 can determine the first drivable area 1102, detect the objects 1104a and 1104b, determine the reduced drivable area 1106, and the trajectory 1108. Additionally, the vehicle computing device(s) 112 can detect an object 1104c, which can be another vehicle, and an object 1104d, which can be a pedestrian. Although depicted as a vehicle and a pedestrian, respectively, the object 1104c and object 1104d can be any suitable object. By way of example and without limitation, as the vehicle 102 traverses the environment, the vehicle computing device(s) 112 can determine a second cost 1116 can that does not meet or exceed a cost threshold. Based at least in part on determining that the second cost 1116 does not meet or exceed the cost threshold, the vehicle computing device(s) 112 can determine a follow action (e.g., vehicle action 1118) associated with the portion of the trajectory 1108 that is associated with the second cost 1116. By way of example and without limitation, the follow action can be associated with object 1104a such that when object 1104a traverses through the environment, the vehicle 102 can follow the object 1104a based at least in part on the movement of object 1104a.

Additionally, by way of example and without limitation, the vehicle computing device(s) 112 can further determine a third cost 1120 that can meet or exceed the cost threshold. For example, the object 1104d can cause the vehicle computing device(s) 112, in some instances, to determine a third cost 1120 that is higher than the second cost 1116 because the object 1104d is associated with a pedestrian object type. Based at least in part on the third cost 1120 meeting or exceeding the cost threshold, the vehicle computing device(s) 112 can determine a stop vehicle action (e.g., vehicle action 1122) associated with the portion of the trajectory 1108 that is associated with the third cost 1120. By way of example and without limitation, the distances between the location associated with the second cost 1116 and objects 1104a and 1104b as well as the distances between and the location associated with the third cost 1120 and the objects 1104c and 1104d can be substantially similar or the same. Therefore, a difference in the vehicle action 1118 and the vehicle action 1122 can be based at least in part on a different in the second cost 1116 and the third cost 1120, a prioritization, an object type, a weight, etc.

Figure 11C:
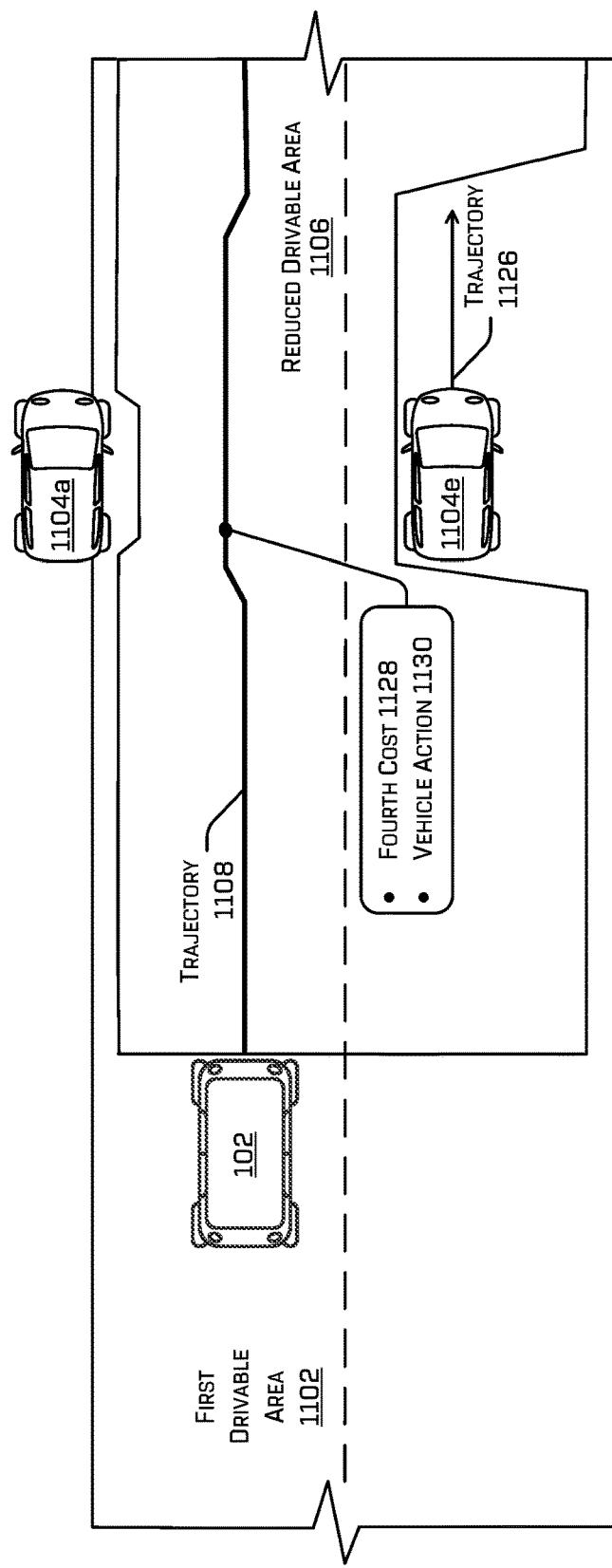

FIG. 11C is another illustration 1124 of determining a cost associated with a portion of a trajectory, in according with embodiments of the disclosure. As discussed above and similar to FIGS. 11A and 11B, the vehicle computing device(s) 112 can determine the first drivable area 1102, detect the object 1104a, determine the reduced drivable area 1106, and the trajectory 1108. In some instances, the vehicle computing device(s) 112 can detect an object 1104e, which can be another vehicle, that is associated with a trajectory 1126. Although depicted as a vehicle, the object 1104e can be any object such as a pedestrian, a bicyclist, and the like. In some instances, the trajectory 1126 can be an estimated trajectory based at least in part on observed characteristics of the object 1104e and/or based at least in part on projecting a location of the vehicle 102 forward in time and projecting a location of the object 1104e forward in time. In some instances, the vehicle computing device(s) 112 can project the location of the vehicle 102 and/or the object 1104e on a periodic basis (e.g., every 0.01 second, every 0.1 second, etc., although any suitable time period is contemplated).

By way of example and without limitation, as the vehicle 102 traverses the environment, the vehicle computing device(s) 112 can determine a fourth cost 1128 that meets or exceeds a cost threshold. Based at least in part on the fourth cost 1128 meeting or exceeding the cost threshold and based at least in part on the trajectory 1126, the vehicle computing device(s) 112 can determine a follow vehicle action (e.g., vehicle action 1130) associated with a portion of the trajectory 1108 that is associated with the fourth cost 1128. In some instances, the follow vehicle action can be based at least in part on the trajectory 1126. Using the follow vehicle cation, the vehicle 102 can follow the trajectory 1108 to continue traversing the environment.

Figure 12:
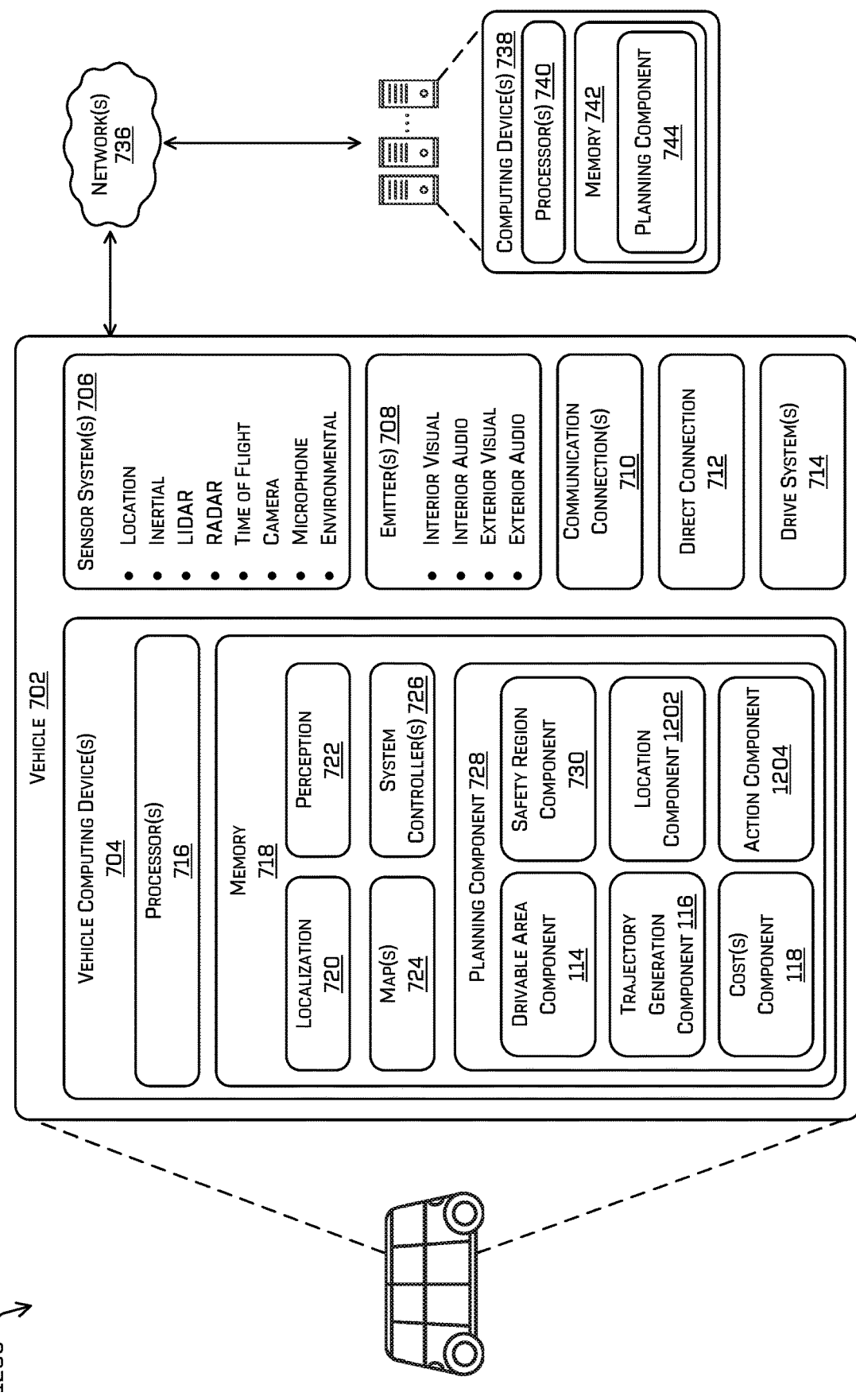
FIG. 12 depicts a block diagram of another example system for implementing the techniques described herein.

FIG. 12 depicts a block diagram of an example system 1200 for implementing the techniques described herein. As described above, the system 1200 can include the vehicle 702 described with reference to FIG. 7.

The planning component 728 can further comprise a location component 1202 and an action component 1204. Though depicted in FIG. 12 as residing in memory 718 for illustrative purposes, it is contemplated that the location component 1202 and the action component 1204 may additionally, or alternatively, be accessible to the vehicle 702 (e.g., stored remotely).

The location component 1202 can include functionality to determine a location of an environment that is associated with a portion of a trajectory of a vehicle. For example, the location component 1202 can receive drivable area data from the drivable area component 114 which can indicate one or more regions including, but not limited to, a drivable region, a reduced drivable region, and/or a collision region, as discussed herein. Additionally, the location component 1202 can receive a reference trajectory and/or a target trajectory within the drivable area.

Based on the trajectory (e.g., the reference trajectory and/or the target trajectory) and the drivable region (e.g., the drivable region, the reduced drivable region, and/or the collision region), the location component 1202 can determine a width associated with a portion of the drivable region. In some instances, the width can represent a distance between a first object and a second object, an object and a boundary of a drivable region, and/or between a first boundary of a drivable region and a second boundary of the drivable region.

The location component 1202 can compare the width with a width of the vehicle and determine a location that is associated with a portion of the trajectory based on the width associated with the portion of the drivable region exceeding the width of the vehicle. The location determined by the location component 1202 can represent a location where the vehicle can proceed toward but not pass without exceeding a cost (e.g., a "blockage"). For example, the cost(s) component 118 can determine a cost associated with the location and a cost threshold. Based on determining that the cost exceeds the cost threshold, the vehicle can determine to proceed toward the location but not pass the location as it traverses the environment.

The action component 1204 can include functionality to determine a vehicle action associated with the location. For example, the action component 1204 can determine vehicle actions that can include a stop action or a follow action, although other suitable vehicle actions are contemplated. A stop action can indicate that the vehicle should stop at or near the location associated with the stop action. A follow action can indicate that the vehicle should follow an object (e.g., another vehicle in the environment). As discussed above, an object can change a position and the vehicle can perform a follow action associated with the object to maintain a distance and/or speed relative to the object to be followed.

Figure 13:
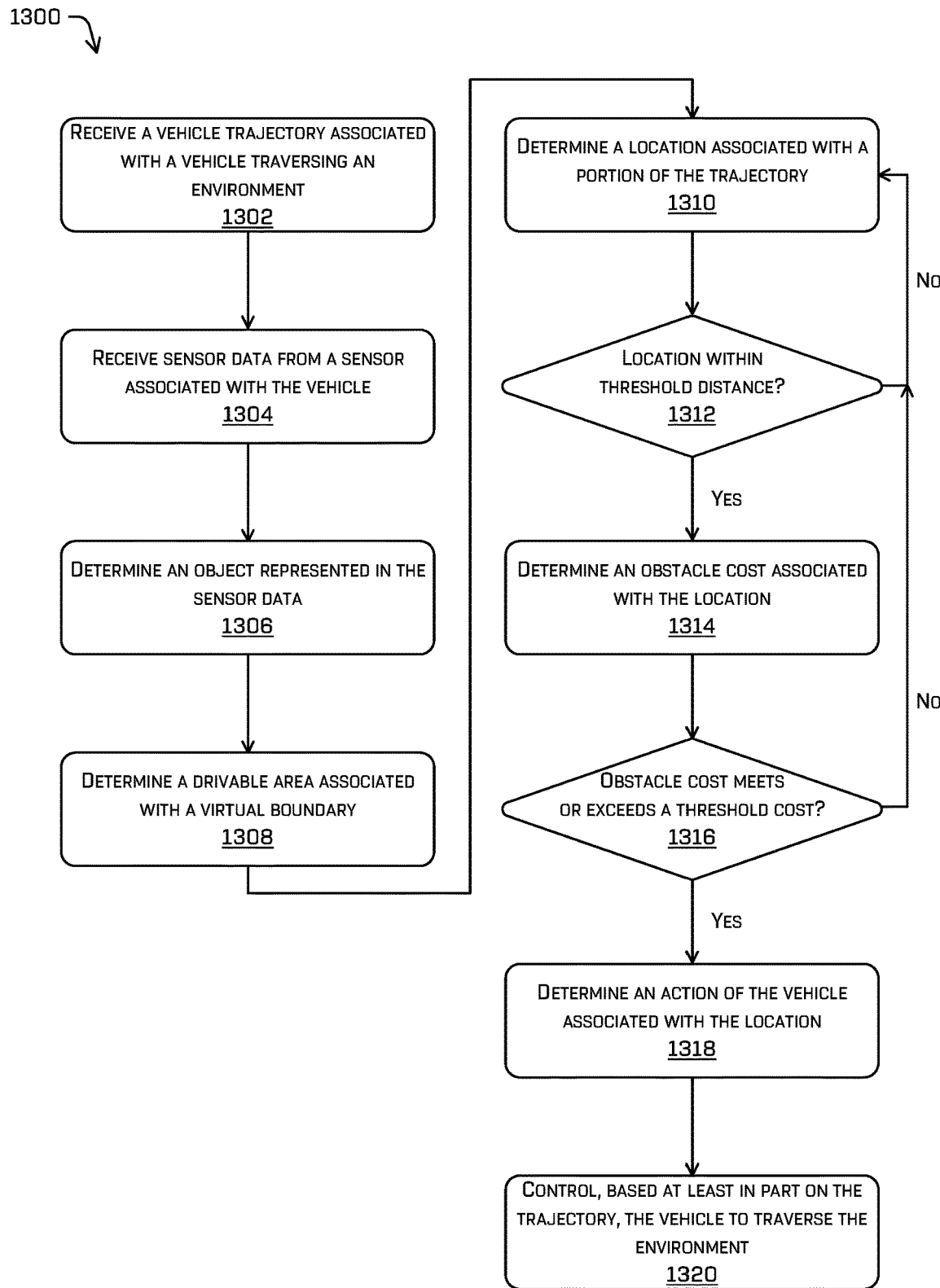
FIG. 13 depicts an example process for determining a cost of a location that is associated with a portion of a trajectory and evaluating the cost to determine an action, in accordance with embodiments of the disclosure.

FIG. 13 depicts an example process 1300 for determining a cost of a location that is associated with a portion of a trajectory and evaluating the cost to determine an action, in accordance with embodiments of the disclosure.

At operation 1302, the process 1300 can include receiving a vehicle trajectory associated with a vehicle traversing an environment. In some instances, the trajectory can be a reference trajectory that comprises a segment of a continuous trajectory or a piecewise trajectory, depending on an action to be performed and a path to be followed in an environment. In some examples, a reference trajectory can be based at least in part on map data (e.g., a centerline of a road segment), static and/or dynamic obstacles in an environment, a minimum or maximum longitudinal acceleration or velocity, a maximum steering angle, vehicle dynamics (e.g., a notion that the wheels do not slip, etc.).

In some instances, the trajectory can be a target trajectory that can be based at least in part on evaluating one or more costs at points on the reference trajectory relative to the drivable area, whereby a density of points on the reference trajectory and weights associated with cost(s) can be determined as discussed herein.

At operation 1304, the process 1300 can include receiving sensor data from a sensor associated with the vehicle. The sensor data can include image data, lidar data, radar data, time of flight data, sonar data, and the like, that is associated with an environment of the vehicle.

At operation 1306, the process 1300 can include determining an object represented in the sensor data. For example, the vehicle can include a perception system, which can perform object detection, segmentation, and/or classification based at least in part on the sensor data received from sensor systems to detect the object represented in the sensor data.

At operation 1308, the process 1300 can include determining a drivable area associated with a virtual boundary. For example, the vehicle can determine a drivable region of an environment by using data such as sensor data of an environment and/or map data of an environment to determine the drivable region of the environment. In some instances, the drivable region can represent a region in the environment that can define the constraints and/or boundaries (e.g., virtual boundaries) within which a vehicle can safely travel relative to the objects to effectively reach an intended destination.

At operation 1310, the process 1300 can include determining a location associated with a portion of the trajectory. As discussed above, the location can be a location that is separated by a distance from an object in the environment and/or a boundary of a drivable area (e.g., a drivable area, a reduced drivable area, and/or a collision region). In some examples, the location can be determined by predicting motion of the vehicle along a trajectory over time. Further, position(s) of objects in an environment can be determined based on predicted motion of such objects over time to determine relative and/or expected locations of the vehicle and object(s) in an environment (e.g., in the future).

At operation 1312, the process 1300 can include comparing the location with a threshold distance. The threshold distance can be based on a dimension of the vehicle (e.g., a width of the vehicle) and/or a capability of the vehicle. As discussed above, a capability of the vehicle can indicate an acceleration capability, a turning radius capability, and the like. If the location is not within the threshold distance, then the process 1300 can return to operation 1310. If the location is within the threshold distance, then the process 1300 can proceed to operation 1314.

At operation 1314, the process 1300 can include determining an obstacle cost associated with the location. As discussed above, a cost can include, but is not limited to a reference cost, an obstacle cost, a lateral cost, a longitudinal cost, and the like, where an obstacle cost increases when the distance that separates the location from the object decreases as compared to the threshold distance and where the obstacle cost decreases when the distance that separates the location from the object increases as compared to the threshold distance.

At operation 1316, the process 1300 can include comparing the obstacle cost with a threshold cost. If the obstacle cost does not meet or exceed the threshold cost, then the process 1300 can return to operation 1310. If the obstacle cost meets or exceeds the threshold cost, then the process 1300 can proceed to operation 1318.

At operation 1318, the process 1300 can include determining an action of the vehicle associated with the location. As discussed above, an action can include a stop action or a follow action, although other suitable actions are contemplated such as a slow action, yield action, etc.

At operation 1320, the process 1300 can include controlling, based at least in part on the trajectory, the vehicle to traverse the environment. In some instances, the vehicle can perform the action determined at operation 1318 at or near the location. In some instances, the vehicle can refrain from performing the action.

At operation 1318, the process 1300 can include determining an action of the vehicle associated with the location. As discussed above, an action can include a stop action or a follow action, although other suitable actions are contemplated.

The techniques discussed herein can improve a functioning of a computing device in a number of additional ways. In some cases, determining a cost and a vehicle action, based on the cost, can reduce an amount of processing by allowing a planner system to evaluate a predicted safety outcome without discarding a trajectory of the vehicle. This can allow a vehicle to progress along the trajectory as it approaches a location associated with the vehicle action. In some examples, determining vehicle actions associated with a cost can result in safer outcomes (e.g., by stopping a vehicle near a blockage and/or proceeding by executing a follow action) and/or can result in more comfortable trajectories (e.g., by reducing unnecessary stops and/or brake taps). In some examples, determining varying costs associated with various objects can improve safety by generating and/or modifying the vehicle actions and/or trajectory based on costs. Further, the techniques discussed herein can be used alone or in combination to improve safety and/or comfort in a variety of systems that generate the vehicle actions.

EXAMPLE CLAUSES

A: A system comprising: one or more processors; and one or more computer-readable media storing instructions executable by the one or more processors, wherein the instructions, when executed, cause the system to perform operations comprising: receiving a reference trajectory representing an initial trajectory for an autonomous vehicle to traverse an environment; determining a first point density of first points associated with a first portion of the reference trajectory; determining a second point density of second points associated with a second portion of the reference trajectory, wherein the second point density is less than the first point density; evaluating a cost function at a first point of the first points and at a second point of the second points to generate a target trajectory comprising first corresponding points and second corresponding points, wherein a first corresponding point of the first corresponding points corresponds to the first point of the first points, and wherein a second corresponding point of the second corresponding points corresponds to a second point of the second points; and controlling the autonomous vehicle to traverse the environment based at least in part on the target trajectory.

B: The system of paragraph A, wherein the first point density is based, at least in part, on one or more of: a time period between adjacent points of the first points; or a distance between the adjacent points of the first points.

C: The system of paragraph A or B, wherein the cost function comprises a cost based at least in part on a distance between the first corresponding point of the target trajectory and a point associated with an obstacle in the environment.

D: The system of any of paragraphs A-C, wherein the first point density is based at least in part on determining that at least one of: a first cost associated with a curvature value associated with the first point of the reference trajectory; or a second cost associated with a distance between the first point and a point associated with an obstacle in the environment.

E: The system of paragraph D, wherein determining the first point density comprises accessing a lookup table or a function to determine the first point density based at least in part on the first cost or the second cost.

F: The system of any of paragraphs A-E, wherein a first time period associated with the first point and an adjacent first point of the first points is less than a second time period associated with the second point and an adjacent second point of the second points.

G: A method comprising: receiving a first trajectory representing an initial trajectory for a vehicle to traverse an environment; determining a point density for points associated with a portion of the first trajectory based at least in part on a first cost associated with a curvature value of the portion or a second cost associated with a distance between a first point of the portion and a second point associated with an obstacle in the environment; determining, based at least on a cost associated with the first point, a second trajectory; and controlling the vehicle to traverse the environment based at least in part on the second trajectory.

H: The method of paragraph G, wherein at least one of: the point density increases as the first cost associated with the curvature value increases; or the point density increases as the second cost associated with the distance between a first point and the second point increases.

I: The method of paragraph G or H, wherein: the point density is a first point density; the portion is a first portion; the points are first points; the curvature value is a first curvature value; the distance is a first distance; the obstacle is a first obstacle; and the method further comprises: determining a second point density for second points associated with a second portion the first trajectory based at least in part on a third cost associated with a second curvature value of the second portion or a fourth cost associated with a second distance between a third point of the second portion and a fourth point associated with a second obstacle in the environment, wherein the first point density is different than the second point density.

J: The method of any of paragraphs G-I, wherein the distance is a first distance, and wherein the point density is based at least in part on one of: a second distance between the first point on the portion and an adjacent first point on the portion; or a time period associated with a difference in a first time associated with the first point and a second time associated with the adjacent first point.

K: The method of any of paragraphs G-J, wherein the cost is based at least in part on the distance between the first point of the portion and the second point associated with the obstacle in the environment.

L: The method of any of paragraphs G-K, wherein determining the second trajectory further comprises: evaluating the cost for a plurality of points associated with the first trajectory to generate the second trajectory.

M: The method of any of paragraphs G-L, further comprising: receiving the first trajectory from a first layer of a planning system of the vehicle, wherein the first trajectory is generated with respect to a distance between points on the first trajectory and the second trajectory is generated, by a second layer of the planning system, with respect to a time period between points on the second trajectory.

N: The method of paragraph M, wherein the point density is non-uniform with respect to the portion of the first trajectory.

O: A non-transitory computer-readable medium storing instructions that, when executed, cause one or more processors to perform operations comprising: receiving a first trajectory representing an initial trajectory for a vehicle to traverse an environment; determining a point density for points associated with a portion of the first trajectory based at least in part on a first cost associated with a curvature value of the portion or a second cost associated with a distance between a first point of the portion and a second point associated with an obstacle in the environment; generating, based at least in part on a cost associated with the first point, a second trajectory, the second trajectory comprising a target point; and controlling the vehicle to traverse the environment based at least in part on the second trajectory.

P: The non-transitory computer-readable medium of paragraph O, wherein at least one of: the point density increases as the first cost associated with the curvature value increases; or the point density increases as the second cost associated with the distance between a first point and the second point increases.

Q: The non-transitory computer-readable medium of paragraph O or P, wherein: the point density is a first point density; the portion is a first portion; the points are first points; the curvature value is a first curvature value; the distance is a first distance; the obstacle is a first obstacle; and the operations further comprise: determining a second point density for second points associated with a second portion the first trajectory based at least in part on a third cost associated with a second curvature value of the second portion or a fourth cost associated with a second distance between a third point of the second portion and a fourth point associated with a second obstacle in the environment, wherein the first point density is different than the second point density.

R: The non-transitory computer-readable medium of any of paragraphs O-Q, wherein the distance is a first distance, and wherein the cost is based at least in part on a second distance between the target point of the second trajectory and the second point associated with the obstacle in the environment.

S: The non-transitory computer-readable medium of any of paragraphs O-R, wherein a first time period associated with the first point and an adjacent first point of the first points is less than a second time period associated with the second point and an adjacent second point of the second points.

T: The non-transitory computer-readable medium of paragraph S, the operations further comprising: receiving the first trajectory from a first layer of a planning system of the vehicle, wherein the first trajectory is generated with respect to a Euclidian distance between points on the first trajectory and the second trajectory is generated, by a second layer of the planning system, with respect to a time period between points on the second trajectory.

U: A system comprising: one or more processors; and one or more computer-readable media storing instructions executable by the one or more processors, wherein the instructions, when executed, cause the system to perform operations comprising: receiving a reference trajectory representing an initial path for an autonomous vehicle to traverse an environment; determining a first portion of the reference trajectory; determining a second portion of the reference trajectory that is separate from the first portion; determining a first weight associated with a first reference cost to be evaluated at a first point associated with the first portion of the reference trajectory, wherein the first reference cost is associated with a first difference between the first point on the reference trajectory and a corresponding first point; determining a second weight associated with a second reference cost to be evaluated at a second point associated with the second portion of the reference trajectory, wherein the second reference cost is associated with a second difference between the second point on the reference trajectory and a corresponding second point, wherein the second weight is larger than the first weight; evaluating a reference cost function at the first point and the second point to generate a target trajectory comprising the corresponding first point and the corresponding second point; and controlling the autonomous vehicle to traverse the environment based at least in part on the target trajectory.

V: The system of paragraph U, wherein the first portion of the reference trajectory is associated with at least one of a discontinuity in the reference trajectory or an obstacle cost that meets or exceeds a threshold obstacle cost.

W. The system of paragraph U or V, wherein the first difference comprises one or more of a difference in a yaw, a lateral offset, a velocity, an acceleration, a curvature, or a curvature rate.

X: The system of any of paragraphs U-W, wherein the first weight is based at least in part on one or more of: determining that a lateral displacement associated with a portion of the target trajectory corresponding to the first portion of the reference trajectory is below a first threshold distance for a given a time period; or determining that the lateral displacement associated with the portion of the target trajectory corresponding to the first portion of the reference trajectory is below a second threshold distance for a given distance.

Y: The system of any of paragraphs U-X, wherein the first reference cost comprises a penalty associated with generating the target trajectory that deviates, at the first point and represented as the first difference, from the reference trajectory.

Z: A method comprising: receiving a first trajectory for an autonomous vehicle to traverse an environment; determining a first portion of the first trajectory; determining a second portion of the first trajectory that is separate from the first portion; determining a first weight associated with the first portion of the first trajectory; determining a second weight associated with second portion of the first trajectory, wherein the first weight is different than the second weight; evaluating, with respect to the first trajectory and based at least in part on the first weight and the second weight, a reference cost to generate a second trajectory; and controlling the autonomous vehicle to traverse the environment based at least in part on the second trajectory.

AA: The method of paragraph Z, wherein evaluating the reference cost comprises: evaluating a first reference cost associated with the first portion, the first reference cost proportional to the first weight; and evaluating a second reference cost associated with the second portion, the second reference cost proportional to the second weight.

AB: The method of paragraph Z or AA, wherein the first portion of the first trajectory is associated with points, and wherein the point is a first point, the method further comprising: determining a point density for the points associated with the first portion of the first trajectory based at least in part on a first cost associated with a curvature value of the first portion or a second cost associated with a distance between the first point of the first portion and a second point associated with an obstacle in the environment.

AC: The method of any of paragraphs Z-AB, wherein the reference cost is associated with a difference between a first point on the first trajectory and a corresponding first point on the second trajectory.

AD: The method of paragraph AC, wherein the difference comprises one or more of a difference in a yaw, a lateral offset, a velocity, an acceleration, a curvature, or a curvature rate.

AE: The method of any of paragraphs Z-AD, wherein the first portion of the first trajectory is associated with at least one of a discontinuity in the first trajectory or an obstacle cost that meets or exceeds a threshold obstacle cost.

AF. The method of paragraph AE, wherein: the discontinuity in the first trajectory represents a lane change action; or the obstacle cost meeting or exceeding the threshold obstacle cost represents a least a portion of the first trajectory passing within an area representing an obstacle in the environment.

AG: The method of any of paragraphs Z-AF, further comprising: determining a drivable area through the environment for the autonomous vehicle, wherein the drivable area represents a region in the environment on which the autonomous vehicle is configured to traverse and an object in the environment; and evaluating an obstacle cost based at least in part on the drivable area; wherein the second trajectory is based at least in part on the obstacle cost.

AH: The method of paragraph AG, wherein determining the drivable area is based at least in part on a velocity associated with the autonomous vehicle or a classification of the object.

AI: A non-transitory computer-readable medium storing instructions that, when executed, cause one or more processors to perform operations comprising: receiving a first trajectory for an autonomous vehicle to traverse an environment; determining a first portion of the first trajectory; determining a second portion of the first trajectory that is separate from the first portion; determining a first weight associated with the first portion of the first trajectory; determining a second weight associated with second portion of the first trajectory, wherein the first weight is different than the second weight; evaluating, with respect to the first trajectory and based at least in part on the first weight and the second weight, a reference cost to generate a second trajectory; and controlling the autonomous vehicle to traverse the environment based at least in part on the second trajectory.

AJ: The non-transitory computer-readable medium of paragraph AI, wherein: evaluating the reference cost comprises: evaluating a first reference cost associated with the first portion, the first reference cost proportional to the first weight; and evaluating a second reference cost associated with the second portion, the second reference cost proportional to the second weight.

AK: The non-transitory computer-readable medium of paragraph AI or AJ, wherein the reference cost is associated with a difference between a first point on the first trajectory and a corresponding first point on the second trajectory.

AL: The non-transitory computer-readable medium of any of paragraphs AI-AK, wherein the first portion of the first trajectory is associated with at least one of a discontinuity in the first trajectory or an obstacle cost that meets or exceeds a threshold obstacle cost.

AM: The non-transitory computer-readable medium of any of paragraphs AI-AL, wherein the operations further comprise: determining a drivable area through the environment for the autonomous vehicle, wherein the drivable area represents a region in the environment on which the autonomous vehicle is configured to traverse and an object in the environment; and evaluating an obstacle cost based at least in part on the drivable area; wherein the second trajectory is based at least in part on the obstacle cost.

AN: The non-transitory computer-readable medium of paragraph AM, wherein determining the drivable area is based at least in part on a velocity associated with the autonomous vehicle or a classification of the object.

AO: A system comprising: one or more processors; and one or more computer-readable media storing computer-executable instructions that, when executed, cause the system to perform operations comprising: receiving sensor data from a sensor associated with an autonomous vehicle traversing an environment; determining a first drivable area for the autonomous vehicle to traverse in the environment, the first drivable area associated with a first width; determining an object represented in the sensor data; determining an object type associated with the object; determining, based at least in part on the object type, a distance threshold; determining a distance between the autonomous vehicle and the object; determining that the distance is below the distance threshold; determining, based at least in part on the distance being below the distance threshold, a second drivable area associated with a second width that is less than the first width; determining a cost associated with the second drivable area; determining, based at least in part on the cost, a target trajectory; and controlling, based at least in part on the target trajectory, the autonomous vehicle to traverse the environment.

AP: The system of paragraph AO, the operations further comprising: determining a probability that the object will be adjacent to the autonomous vehicle within a period of time; and determining that the probability meets or exceeds a probability threshold; wherein determining the second drivable area is further based at least in part on the probability meeting or exceeding the probability threshold.

AQ: The system of paragraph AO, wherein determining the second drivable area is associated with a first time and comprises: determining, based at least in part on a first velocity associated with the object and a second velocity associated with the autonomous vehicle, a location of the autonomous vehicle at a second time after the first time;

wherein determining, the second drivable area is further based at least in part on the location.

AR: The system of paragraph AO, the operations further comprising: determining, based at least in part on a longitudinal displacement, a transition area between the first drivable area and the second drivable area; wherein determining the target trajectory is further based at least in part on the transition area.

AS: The system of paragraph AO, wherein the object type comprises one or more of a bicyclist, a pedestrian, a vehicle, a static object, or a dynamic object.

AT: A method comprising: receiving sensor data from a sensor associated with a vehicle traversing an environment; determining a first area for the vehicle to traverse in the environment, the first area associated with a first width; determining an object represented in the sensor data; determining a distance between the vehicle and the object; determining, based at least in part on information associated with the object, a second area associated with a second width that is less than the first width; determining, based at least in part on the second area, a cost associated with the vehicle traversing the second area; determining, based at least in part on the cost, a trajectory; and controlling the vehicle based at least in part on the trajectory.

AU: The method of paragraph AT, wherein the information comprises a distance of the object from the vehicle, the method further comprising: determining a classification associated with the object; and determining, based at least in part on the classification, a distance threshold, wherein determining the second area is further based at least in part on the distance being less than or equal to the distance threshold.

AV: The method of paragraph AU, wherein the distance threshold is an upper distance threshold, the method further comprising: determining, based at least in part on the object, a lower distance threshold; and determining that the distance meets or exceeds the lower distance threshold; wherein determining the second area is further based at least in part on determining that the distance meets or exceeds the lower distance threshold.

AW: The method of paragraph AT, the method further comprising: determining a probability that the object will be within a distance threshold to the vehicle within a period of time; and determining that the probability meets or exceeds a probability threshold; wherein determining the second area is further based at least in part on the probability meeting or exceeding the probability threshold.

AX: The method of paragraph AT, wherein determining the second area is associated with a first time, the method further comprising: determining, based at least in part on a first velocity associated with the object and a second velocity associated with the vehicle, a location of the vehicle at a second time after the first time; wherein determining the second area is further based at least in part on the location.

AY: The method of paragraph AT, wherein the vehicle is a first vehicle, the method further comprising: determining, based at least in part on the sensor data, an object type associated with the object, the object type comprising at least one of: a second vehicle; a pedestrian; a bicyclist; an animal; a static object; or a dynamic object.

AZ: The method of paragraph AY, wherein determining the second area is based at least in part on the object type.

BA: The method of paragraph AT, further comprising: determining, based at least in part on a longitudinal displacement associated with the vehicle, a transition area between the first area and the second area; wherein determining the trajectory is further based at least in part on the transition area.

BB: A non-transitory computer-readable medium storing instructions executable by one or more processors, wherein the instructions, when executed, cause the one or more processors to perform operations comprising: receiving sensor data from a sensor associated with a vehicle traversing an environment; determining a first area on which the vehicle is able to traverse, the first area associated with a first width; determining an object represented in the sensor data; determining, based at least in part on information associated with the object, a second area associated with a second width; determining, based at least in part on the second area, a cost associated with operating the vehicle in the environment; determining, based at least in part on the cost, a trajectory associated with the vehicle; and controlling the vehicle based at least in part on the trajectory.

BC: The non-transitory computer-readable medium of paragraph BB, the operations further comprising: determining a classification associated with the object determining a distance between the vehicle and the object; and determining, based at least in part on the classification, a distance threshold, wherein the information comprises the classification, and wherein determining the second area is further based at least in part on the distance being less than or equal to the distance threshold.

BD: The non-transitory computer-readable medium of paragraph BB, the operations further comprising: determining a distance between the vehicle and the object; determining an upper distance threshold; determining, based at least in part on the object, a lower distance threshold; and determining that the distance meets or exceeds the lower distance threshold, and wherein the information comprises determining that a distance between the object and the vehicle meets or exceeds the lower distance threshold.

BE: The non-transitory computer-readable medium of paragraph BB, the operations further comprising: determining a probability that the object will be within a distance threshold to the vehicle within a period of time; and determining that the probability meets or exceeds a probability threshold, wherein the information comprises the probability meeting or exceeding the probability threshold.

BF: The non-transitory computer-readable medium of paragraph BB, wherein determining the second area is associated with a first time, the operations further comprising: determining, based at least in part on a first velocity associated with the object and a second velocity associated with the vehicle, a location of the vehicle at a second time after the first time; wherein determining the second area is further based at least in part on the location.

BG: The non-transitory computer-readable medium of paragraph BB, wherein the vehicle is a first vehicle, the operations further comprising: determining, based at least in part on the sensor data, an object type associated with the object, wherein the object type indicates that the object is associated with at least one of: a second vehicle; a pedestrian; a bicyclist; an animal; a static object; or a dynamic object.

BH: The non-transitory computer-readable medium of paragraph BB, the operations further comprising: determining, based at least in part on a longitudinal displacement, a transition area between the first area and the second area; wherein determining the trajectory is further based at least in part on the transition area.

BI: A system comprising: one or more processors; and one or more computer-readable media storing computer-executable instructions that, when executed, cause the one or more processors to perform operations comprising: receiving a vehicle trajectory associated with an autonomous vehicle traversing an environment; receiving sensor data from a sensor associated with the autonomous vehicle; determining an object represented in the sensor data; determining a drivable area on which the autonomous vehicle is to navigate; determining a location associated with a portion of the vehicle trajectory; determining, based at least in part on the location, the drivable area, and a width associated with the autonomous vehicle, a cost; determining, based at least in part on the cost, an action of the autonomous vehicle associated with the location; and controlling the autonomous vehicle based at least in part on the action.

BJ: The system of paragraph BI, wherein the action is a stop action that, when performed by the autonomous vehicle, causes the autonomous vehicle to stop within a threshold distance to the location.

BK: The system of paragraph BI, wherein the cost is based at least in part on a first width of the drivable area at the location and a second width of the autonomous vehicle.

BL: The system of paragraph BI, wherein determining the action is associated with a first time, the operations further comprising: determining an object trajectory associated with the object, the object trajectory associated with increasing a distance between the object and the location; wherein controlling the autonomous vehicle comprises refraining from performing the action based at least in part on determining the object trajectory.

BM: The system of paragraph BI, the operations further comprising: wherein determining the cost is further based at least in part on one or more of an acceleration capability of the autonomous vehicle or a turning capability of the autonomous vehicle.

BN: The system of paragraph BI, the operations further comprising: determining that the object is a dynamic object; wherein the action is a follow action that, when performed by the autonomous vehicle, causes the autonomous vehicle to follow the object within a threshold distance.

BO: A method comprising: receiving a trajectory associated with a vehicle traversing an environment; receiving sensor data from a sensor associated with the vehicle; determining a drivable area; determining a location associated with the trajectory; determining, based at least in part on the trajectory and the drivable area, a cost associated with the location; determining an action of the vehicle associated with the location; and controlling, based at least in part on the action, the vehicle to traverse the environment.

BP: The method of paragraph BO, wherein the cost is based at least in part on a first width of the drivable area at the location and a second width of the vehicle.

BQ: The method of paragraph BO, further comprising: determining that the cost meets or exceeds a cost threshold, wherein the action is a stop action that, when performed by the vehicle, causes the vehicle to stop within a second threshold distance to the location.

BR: The method of paragraph BO, wherein the cost is based at least in part on a width of the drivable area at the location and a width of the vehicle.

BS: The method of paragraph BO, further comprising: determining, based at least in part on the sensor data, an object in the environment; and determining an object trajectory associated with the object, the object trajectory associated with increasing a distance between the object and the location, wherein the action comprises continuing along the trajectory.

BT: The method of paragraph BO, further comprising: determining, based at least in part on the sensor data, an object in the environment; and determining an object type associated with the object; wherein determining the cost is further based at least in part on the object type.

BU: The method of paragraph BO, further comprising: determining, based at least in part on the sensor data, an object in the environment; and determining that the object is a dynamic object; wherein the action is a follow action that, when performed by the vehicle, causes the vehicle to follow the object within a second threshold distance.

BV: A non-transitory computer-readable medium storing instructions executable by a processor, wherein the instructions, when executed, cause the processor to perform operations comprising: receiving a trajectory associated with a vehicle traversing an environment; receiving sensor data from a sensor associated with the vehicle; determining an area; determining a location associated with a portion of the trajectory; determining, based at least in part on the trajectory, a cost associated with the location; determining an action of the vehicle associated with the location; and controlling, based at least in part on the action, the vehicle to traverse the environment.

BW: The non-transitory computer-readable medium of paragraph BV, wherein a first boundary of the area is associated with a first cost function, and wherein a second boundary of the area is associated with a second cost function different from the first cost function.

BX: The non-transitory computer-readable medium of paragraph BV, the operations further comprising determining the cost meets or exceeds a threshold cost, and wherein the action is a stop action that, when performed by the vehicle, causes the vehicle to stop within a second distance to the location.

BY: The non-transitory computer-readable medium of paragraph BV, wherein the cost is based at least in part on a first width of the area at the location and a second width of the vehicle.

BZ: The non-transitory computer-readable medium of paragraph BV, the operations further comprising: determining, based at least in part on the sensor data, an object in the environment; and determining an object trajectory associated with the object, the object trajectory associated with increasing a distance between the object and the location, wherein the action comprises continuing along the trajectory.

CA: The non-transitory computer-readable medium of paragraph BV, the operations further comprising: determining, based at least in part on the sensor data, an object in the environment; determining an object type associated with the object; determining a first pose associated with the vehicle; and determining a second pose associated with the object, wherein a capability of the vehicle to traverse the location is based at least in part on the first pose, wherein the area is based at least in part on the second pose, and wherein determining the cost is further based at least in part on the object type, the capability of the vehicle, and the area.

CB: The non-transitory computer-readable medium of paragraph BV, the operations further comprising: determining, based at least in part on the sensor data, an object in the environment; determining that the object is a dynamic object; wherein the action is a follow action that, when performed by the vehicle, causes the vehicle to follow the object within a second threshold distance.

While the example clauses described above are described with respect to one particular implementation, it should be understood that, in the context of this document, the content of the example clauses can also be implemented via a method, device, system, a computer-readable medium, and/or another implementation. Additionally, any of examples A-CB may be implemented alone or in combination with any other one or more of the examples A-CB.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing computer-executable instructions that, when executed, cause the system to perform operations comprising:
      receiving sensor data from a sensor associated with an autonomous vehicle traversing an environment;
      determining a first drivable area for the autonomous vehicle to traverse in the environment, the first drivable area associated with a first width;
      determining an object represented in the sensor data;
      determining an object type associated with the object;
      determining, based at least in part on the object type, a distance threshold of a plurality of distance thresholds, wherein the distance threshold is based at least in part on an object type;
      determining a distance between the autonomous vehicle and the object;
      determining that the distance is below the distance threshold;
      determining, based at least in part on the distance being below the distance threshold, a second drivable area associated with a second width that is less than the first width;
      determining a cost associated with the second drivable area;
      determining, based at least in part on the cost, a target trajectory; and
      controlling, based at least in part on the target trajectory, the autonomous vehicle to traverse the environment.

2. The system of claim 1, the operations further comprising:
   determining a probability that the object will be adjacent to the autonomous vehicle within a period of time; and
   determining that the probability meets or exceeds a probability threshold;
   wherein determining the second drivable area is further based at least in part on the probability meeting or exceeding the probability threshold.

3. The system of claim 1, wherein determining the second drivable area is associated with a first time and comprises:
   determining, based at least in part on a first velocity associated with the object and a second velocity associated with the autonomous vehicle, a location of the autonomous vehicle at a second time after the first time;
   wherein determining, the second drivable area is further based at least in part on the location.

4. The system of claim 1, the operations further comprising:
   determining, based at least in part on a longitudinal displacement, a transition area between the first drivable area and the second drivable area;
   wherein determining the target trajectory is further based at least in part on the transition area.

5. The system of claim 1, wherein the object type comprises one or more of a bicyclist, a pedestrian, a vehicle, a static object, or a dynamic object.

6. A method comprising:
   receiving sensor data from a sensor associated with a vehicle traversing an environment;
   determining a first area for the vehicle to traverse in the environment, the first area associated with a first width;
   determining an object represented in the sensor data;
   determining a distance between the vehicle and the object;
   determining a classification associated with the object;
   determining, based at least in part on the classification, a width of a lane bias region of a plurality of widths, wherein the width is based at least in part on a classification;
   determining, based at least in part on the classification, a second area associated with a second width that is less than the first width by the width of the lane bias region;
   determining, based at least in part on the second area, a cost associated with the vehicle traversing the second area;
   determining, based at least in part on the cost, a trajectory; and
   controlling the vehicle based at least in part on the trajectory.

7. The method of claim 6, further comprising:
   determining a distance between the object and the vehicle; and
   determining, based at least in part on the classification, a distance threshold,
   wherein determining the second area is further based at least in part on the distance being less than or equal to the distance threshold.

8. The method of claim 7, wherein the distance threshold is an upper distance threshold, the method further comprising:
   determining, based at least in part on the object, a lower distance threshold; and
   determining that the distance meets or exceeds the lower distance threshold;
   wherein determining the second area is further based at least in part on determining that the distance meets or exceeds the lower distance threshold.

9. The method of claim 6, the method further comprising:
   determining a probability that the object will be within a distance threshold to the vehicle within a period of time; and determining that the probability meets or exceeds a probability threshold;
wherein determining the second area is further based at least in part on the probability meeting or exceeding the probability threshold.

10. The method of claim 6, wherein determining the second area is associated with a first time, the method further comprising:
determining, based at least in part on a first velocity associated with the object and a second velocity associated with the vehicle, a location of the vehicle at a second time after the first time;
wherein determining the second area is further based at least in part on the location.

11. The method of claim 6, wherein the vehicle is a first vehicle, and the classification comprises at least one of:
a second vehicle;
a pedestrian;
a bicyclist;
an animal;
a static object; or
a dynamic object.

12. The method of claim 6, wherein determining the classification is based at least in part on the sensor data.

13. The method of claim 6, further comprising:
determining, based at least in part on a longitudinal displacement associated with the vehicle, a transition area between the first area and the second area;
wherein determining the trajectory is further based at least in part on the transition area.

14. A non-transitory computer-readable medium storing instructions executable by one or more processors, wherein the instructions, when executed, cause the one or more processors to perform operations comprising:
receiving sensor data from a sensor associated with a vehicle traversing an environment;
determining a first area on which the vehicle is able to traverse, the first area associated with a first width;
determining an object represented in the sensor data;
determining a classification associated with the object;
determining, based at least in part on the classification, a second area associated with a second width;
determining, based at least in part on the second area, a cost associated with operating the vehicle in the environment;
determining, based at least in part on the cost, a trajectory associated with the vehicle; and
controlling the vehicle based at least in part on the trajectory.

15. The non-transitory computer-readable medium of claim 14, the operations further comprising:
determining a distance between the vehicle and the object; and
determining, based at least in part on the classification, a distance threshold,
wherein determining the second area is further based at least in part on the distance being less than or equal to the distance threshold.

16. The non-transitory computer-readable medium of claim 14, the operations further comprising:
determining a distance between the vehicle and the object;
determining an upper distance threshold;
determining, based at least in part on the object, a lower distance threshold;
determining that the distance meets or exceeds the lower distance threshold; and
determining the second area further based at least in part on the distance between the vehicle and the object meeting or exceeding the lower distance threshold.

17. The non-transitory computer-readable medium of claim 14, the operations further comprising:
determining a probability that the object will be within a distance threshold to the vehicle within a period of time;
determining that the probability meets or exceeds a probability threshold; and
determining the second area further based at least in part on the probability meeting or exceeding the probability threshold.

18. The non-transitory computer-readable medium of claim 14, wherein determining the second area is associated with a first time, the operations further comprising:
determining, based at least in part on a first velocity associated with the object and a second velocity associated with the vehicle, a location of the vehicle at a second time after the first time;
wherein determining the second area is further based at least in part on the location.

19. The non-transitory computer-readable medium of claim 14, wherein the vehicle is a first vehicle, and the classification indicates that the object is associated with at least one of:
a second vehicle;
a pedestrian;
a bicyclist;
an animal;
a static object; or
a dynamic object.

20. The non-transitory computer-readable medium of claim 14, the operations further comprising:
determining, based at least in part on a longitudinal displacement, a transition area between the first area and the second area;
wherein determining the trajectory is further based at least in part on the transition area.

* * * * *